United States Patent
Sakakibara

(10) Patent No.: US 8,711,589 B2
(45) Date of Patent: Apr. 29, 2014

(54) DIRECT CONVERTING APPARATUS, METHOD FOR CONTROLLING THE SAME, AND CONTROL SIGNAL GENERATION DEVICE

(75) Inventor: Kenichi Sakakibara, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 540 days.

(21) Appl. No.: 13/059,801

(22) PCT Filed: Jul. 27, 2009

(86) PCT No.: PCT/JP2009/063351
§ 371 (c)(1),
(2), (4) Date: Feb. 18, 2011

(87) PCT Pub. No.: WO2010/021226
PCT Pub. Date: Feb. 25, 2010

(65) Prior Publication Data
US 2011/0141777 A1 Jun. 16, 2011

(30) Foreign Application Priority Data

Aug. 21, 2008 (JP) ................. 2008-212989

(51) Int. Cl.
*H02M 7/48* (2007.01)
*H02J 1/10* (2006.01)

(52) U.S. Cl.
USPC ............................................. 363/71; 363/72

(58) Field of Classification Search
USPC .................. 363/34, 37, 71, 72, 131
See application file for complete search history.

(56) References Cited

U.S. PATENT DOCUMENTS

| 5,038,092 A * | 8/1991 | Asano et al. ................... 318/811 |
| 7,190,601 B2 * | 3/2007 | Luukko et al. ................... 363/69 |
| 7,891,451 B2 * | 2/2011 | Oyobe et al. ............. 180/65.275 |
| 2005/0122752 A1 | 6/2005 | Schnetzka |
| 2009/0175059 A1 | 7/2009 | Sakakibara |

FOREIGN PATENT DOCUMENTS

| EP | 1946956 A1 | 7/2008 |
| JP | 9-182458 A | 7/1997 |
| JP | 9-224393 A | 8/1997 |
| JP | 2003-348892 A | 12/2003 |
| JP | 2004-266972 A | 9/2004 |

(Continued)

OTHER PUBLICATIONS

Mazumder, "A Novel Discrete Control Strategy for Independent Stabilization of Parallel Three-Phase Boost Converters by Combining Space-Vector Modulation With Variable-Structure Control," IEEE Transactions on Power Electronics, vol. 18, No. 4, Jul. 2003, pp. 1070-1083.

(Continued)

*Primary Examiner* — Jue Zhang
(74) *Attorney, Agent, or Firm* — Birch, Stewart, Kolasch & Birch, LLP.

(57) ABSTRACT

In a direct converting apparatus including a converter and a plurality of inverters, substantial carrier frequencies of the plurality of inverters are made different from each other while performing an operation in synchronization with the converter. An original carrier has a carrier frequency twice as high as a carrier frequency of a first carrier used for controlling one of the inverters. A waveform of the original carrier is magnified twice with a value serving as the center thereof, so that a second carrier used for controlling the other of the inverters is obtained.

20 Claims, 15 Drawing Sheets

(56) References Cited

FOREIGN PATENT DOCUMENTS

| | | |
|---|---|---|
| JP | 2007-244114 A | 9/2007 |
| JP | 2007-312589 A | 11/2007 |
| JP | 2007-312590 A | 11/2007 |
| JP | 2008-532473 A | 8/2008 |
| WO | WO 2007/123118 A1 | 11/2007 |

OTHER PUBLICATIONS

Kato et al., "Improvement of Waveform for a Boost type AC/DC/AC Direct Converter", Institute of Electrical Engineers of Japan, national convention, Mar. 15-17, 2007, Part 4, 4-098, pp. 153-154.

\* cited by examiner

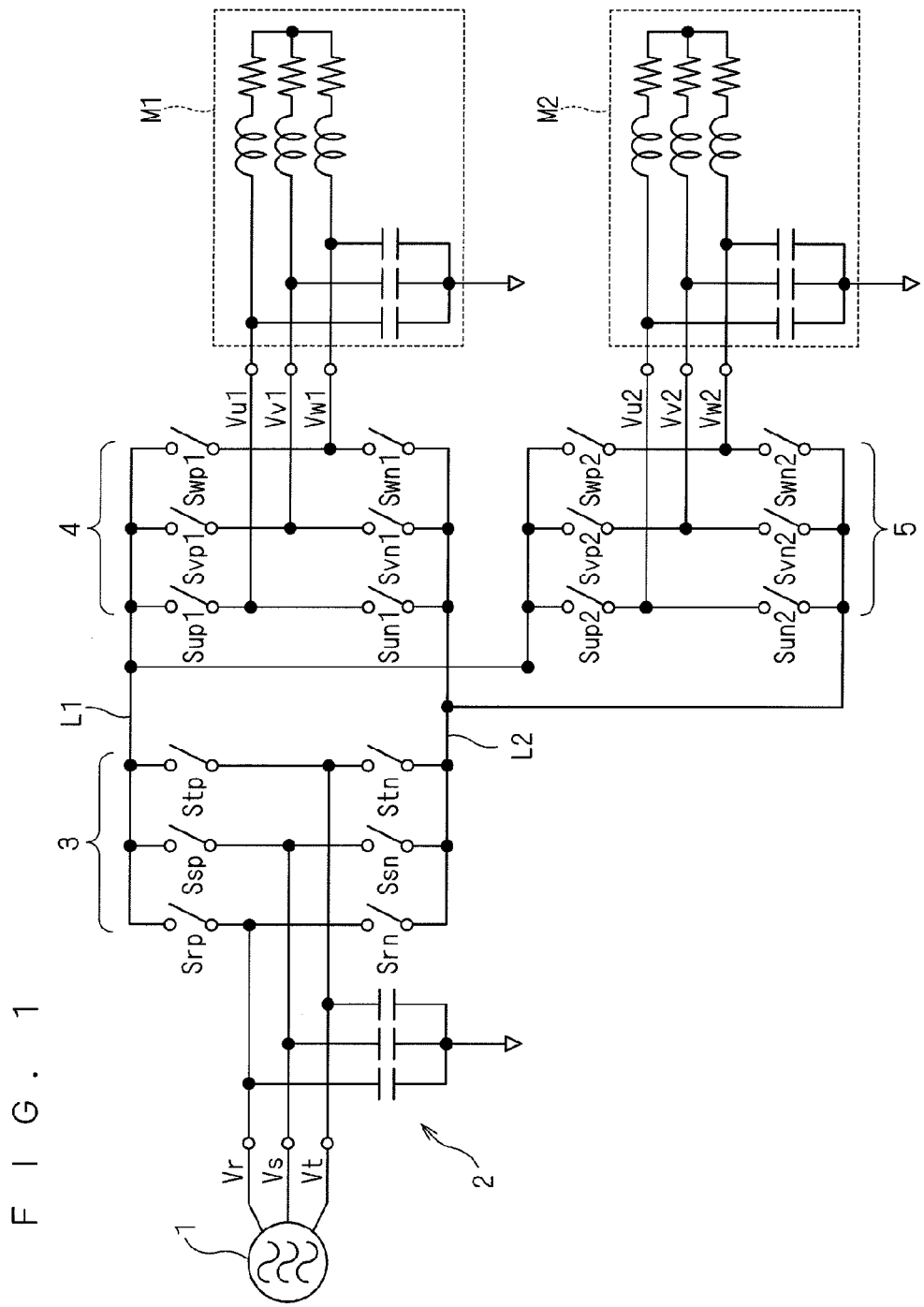
F I G . 1

US 8,711,589 B2

DIRECT CONVERTING APPARATUS, METHOD FOR CONTROLLING THE SAME, AND CONTROL SIGNAL GENERATION DEVICE

TECHNICAL FIELD

The present invention relates to a direct converting apparatus, and particularly to a direct converting apparatus including a converter and a plurality of inverters.

BACKGROUND ART

In a so-called indirect AC power converting apparatus, a large-size capacitor is provided at a so-called DC link between a converter and an inverter. This capacitor has a function to smooth a voltage ripple caused by the commercial frequency. This technique is disclosed in, for example, Japanese Patent Application Laid-Open No. 9-224393 (1997). According to this document, an inverter section for a compressor and an inverter section for a fan are connected in parallel with respect to a smoothing capacitor, to thereby share a power source between both of the inverter sections. In this technique, a DC voltage is shared between both of the inverters, and therefore a control of the fan is corrected in accordance with the DC voltage which varies in accordance with a load of the compressor.

On the other hand, in a direct AC power converting apparatus, a large-size capacitor or reactor is not required. Therefore, in this converting apparatus, downsizing can be expected, and in recent years, there has been an increasing interest in it as a next-generation power converting apparatus. For example, Japanese Patent Application Laid-Open No. 2007-312589 introduces a technique in which one inverter is connected to one converter, and a commutation is caused in the converter when the inverter is operated based on a zero vector and a so-called zero-current state is established (hereinafter, sometimes represented simply as "a commutation in a converter at a zero current"). There is also introduced a technique by which a carrier can be shared between the converter and the inverter.

As for the direct AC power converting apparatus, a technique has also been proposed in which an operation is performed with a plurality of inverters being connected with respect to one converter for the purpose of driving a plurality of loads. This technique is disclosed in, for example, Kato and Ito, "Improvement of Waveform for a Boost type AC/DC/AC Direct Converter", Institute of Electrical Engineers of Japan, national convention 2007 Mar. 15-17, Part 4, 4-098. In this document, a DC/DC converter and a voltage-source inverter are connect in parallel with each other. A current-source rectifier can be recognized as a converter, and the DC/DC converter can be recognized as an inverter. According to the technique shown in this document, in order to cause a commutation in the current-source rectifier at a so-called zero current, a plurality of inverters are controlled by a pulse-width modulation by a single carrier synchronized with a carrier based on which the current-source rectifier is operated.

Japanese Patent Application Laid-Open No. 9-182458 (1997) introduces a technique in which switching for generating a current-source pulse-width control pattern is controlled by using a result of comparison between a carrier and a command value of a phase current which is dual to a phase voltage.

Japanese Patent Application Laid-Open No. 2004-266972 discloses a technique in which inclination is different between a carrier used for a pulse-width modulation of a converter and a carrier used for a pulse-width modulation of an inverter.

DISCLOSURE OF THE INVENTION

Problems to be Solved by the Invention

In an indirect AC power converting apparatus, the frequency of a carrier used for controlling a plurality of inverters can be arbitrarily set. However, in a conventional direct converting apparatus, when a commutation is caused in a converter at a zero current, a plurality of inverters are modulated by a carrier having the same frequency as that of a carrier used for controlling the converter.

On the other hand, in a case where loads driven by the respective inverters have different transfer characteristics from one another, an electromagnetic noise peaks at different frequencies with respect to the same carrier frequency. Therefore, even though a carrier frequency is selected so as to reduce the electromagnetic noise (or so as to exclude the peak of the electromagnetic noise from an audible range) in the combination of one inverter and one load, the electromagnetic noise in the combination of another inverter and another load can sometimes not be reduced (or the peak of the electromagnetic noise can sometimes not be excluded from the audible range).

Therefore, an object of the present invention is to improve the degree of freedom in the selection of a carrier in accordance with load characteristics of inverters by making substantial carrier frequencies of the plurality of inverters different from one another while performing an operation in synchronization with a converter in a direct converting apparatus including the converter and the plurality of inverters.

Means for Solving the Problems

A method for controlling a direct converting apparatus according to the present invention is a method for controlling a direct converting apparatus including: a converter (3) rectifying multi-phase AC voltages (Vr, Vs, Vt) by a pulse-width modulation and outputting them to a pair of DC power supply lines (L1, L2); and a first inverter (4) and a second inverter (5) being connected in parallel with each other between the pair of DC power supply lines, each of them being operated in a pulse-width modulation according to an instantaneous space vector control.

In a first aspect thereof: a commutation is caused in the converter, when a converter carrier (C0) takes the value of a converter command value (drt); and one cycle (T) of the converter carrier is divided by a first value (dst) and a second value (drt) into a first time period (dst·T) and a second time period (drt·T) at a timing when the commutation is caused.

As instantaneous space vectors (V01, V41, V61) adopted for the instantaneous space vector control of the first inverter, a zero vector (V01) is adopted in a first commutation zero vector time period (T01) which is a time period including the timing.

As instantaneous space vectors (V02, V42, V62; V02, V42, V62, V72) used for the instantaneous space vector control of the second inverter, a zero vector (V02; V02, V72) is adopted in a second commutation zero vector time period (T02; T02, T72) which is a time period including the timing.

In the first time period, an arrangement pattern (V41, V61, V41) of the instantaneous space vectors in the first inverter except the zero vector (V01) adopted in the first commutation zero vector time period appears M-times (M is an integer equal to or greater than 1). In the first time period, an arrangement pattern (V42, V62, V42) of the instantaneous space vectors in the second inverter except the zero vector (V02; V02, V72) adopted in the second commutation zero vector time period appears N-times (N is an integer equal to or greater than 2, and different from the M).

A second aspect of the method for controlling the direct converting apparatus according to the present invention is the first aspect thereof, in which, in the second inverter, the first time period has (N−1) non-commutation zero vector time periods (Ts01; Ts1) which are separated from the second commutation zero vector time period (T02; T02, T72) and in which the zero vector (V02; V02, V72) adopted in the second commutation zero vector time period is adopted.

Orders (V42, V62, V42; V62, V42) of vectors used for said instantaneous space vector control of said second inverter in time periods (Tk), each of which is interposed between said second commutation zero vector time period and said non-commutation zero vector time period, are equal to each other.

A third aspect of the method for controlling the direct converting apparatus according to the present invention is the second aspect thereof, in which a first carrier (C1) adopted for the instantaneous space vector control of the first inverter (4) and a second carrier (C2) adopted for the instantaneous space vector control of the second inverter (5) are synchronized with the converter carrier (C0).

In the first carrier, the same waveform appears the M-times in the first time period (dst·T), and in the second carrier, the same waveform appears the N-times in the first time period.

A fourth aspect of the method for controlling the direct converting apparatus according to the present invention is the second aspect thereof, in which: a first carrier (C1) adopted for the instantaneous space vector control of the first inverter is synchronized with the converter carrier (C0); and a second carrier (C2) adopted for the instantaneous space vector control of the second inverter has a cycle equal to a cycle of the converter carrier (C0).

In the first time period (dst·T), for the second carrier, N signal waves (dst(1−V*), drt+dst·V*; drt(1−V*), drt·V*; drt+(⅔)dst+dst·V*, drt·(⅔)dst−dst·V*, drt+dst·V*; drt(1−V*), drt(⅓+V*), drt(⅓·V*)) are set with respect to each phase of the second inverter, the N signal waves being set based on the arrangement pattern in the second inverter.

A fifth aspect of the method for controlling the direct converting apparatus according to the present invention is the fourth aspect thereof, in which for the second carrier, in the second inverter, (N−1) signal waves (drt+dst/2, drt/2) are further set in the first time period (dst·T), the (N−1) signal waves being not based on the arrangement pattern but based on the first value and the second value (drt, dst).

A first aspect of a direct converting apparatus according to the present invention includes the converter (3), the first inverter (4), and the second inverter (5), in which any one of the first to fifth aspects of the method for controlling the direct converting apparatus is performed.

A control signal generation device according to the present invention is a device controlling a direct converting apparatus including: a converter (3) rectifying multi-phase AC voltages (Vr, Vs, Vt) and outputting them to a pair of DC power supply lines (L1, L2); and a first inverter (4) and a second inverter (5) being connected in parallel with each other between the pair of DC power supply lines.

A first aspect thereof includes: a first inverter control section (61) outputting a first control signal (Sup1*, Sun1*; Svp1*, Svn1*; Swp1, Swn1) for operating the first inverter in a pulse-width modulation according to an instantaneous space vector control; a second inverter control section (62) outputting a second control signal (Sup2*, Sun2*; Svp2*, Svn2*; Swp2*, Swn2*) for operating the second inverter in a pulse-width modulation according to an instantaneous space vector control; and a converter control section (60) outputting a third control signal (Srp*, Ssp*, Stp*, Srn*, Ssn*, Stn*) for causing a commutation in the converter.

The converter control section includes: a carrier generation section (604) generating a converter carrier (C0); a converter command generation section (601) generating a converter command value (Vr*, Vs*, Vt*); a third control signal generation section (603, 609) generating the third control signal for performing a pulse-width control of the converter, by using a result of comparison between the converter carrier and the converter command value; and an intermediate phase detection section (602) outputting a current conduction ratio (dst) of an intermediate phase (Vs*) of the command value (Vr*, Vs*, Vt*) for the converter.

The first inverter control section includes: a first output command generation section (611) generating a first output command value (Vu1*, Vv1*, Vw1*) which is a command value of an output of the first inverter; a first computation section (612, 613) generating a first inverter signal wave (drt+dst·V*, drt(1−V*)) to be compared with a first carrier (C1) synchronized with the converter carrier, based on the current conduction ratio and the first output command value; and a first control signal generation section (614, 615, 619) generating the first control signal based on a result of the comparison.

The second inverter control section includes: a second output command generation section (621) generating a second output command value (Vu2*, Vv2*, Vw2*) which is a command value of an output of the second inverter; a second computation section (622, 623; 622A, 622B, 623A, 623B; 622A, 622B1, 622C1, 623A, 623B1, 623C1; 622A, 622B2, 622C2, 623A, 623B2, 623C2) generating a second inverter signal wave (drt+dst·V*, drt(1−V*); drt(1−V*), drt·V*; drt+dst·V*, drt+dst(⅔−V*), drt+dst(⅔+V*), drt(1−V*), drt(⅓+V), drt(⅓−V*); drt+dst·V*, drt+dst(½+V*), drt+dst/2, drt(1−V*), drt(½−V*), drt/2)) to be compared with a second carrier (C2) synchronized with the converter carrier, based on the current conduction ratio and the second output command value; and a second control signal generation section (624, 625, 629; 624A, 624B, 625A, 625B, 628; 624A, 624B, 624C, 625A, 625B, 625C, 627; 624A, 624B, 624C, 625A, 625B, 625C, 627) generating the second control signal based on a result of the comparison.

As instantaneous space vectors (V01, V41, V61) adopted for the instantaneous space vector control of the first inverter, a zero vector (V01) is adopted in a first commutation zero vector time period (T01) which is a time period including a timing when the converter carrier takes the value of the intermediate phase. As instantaneous space vectors (V02, V42, V62; V02, V42, V62, V72) used for the instantaneous space vector control of the second inverter, a zero vector (V02; V02, V72) is adopted in a second commutation zero vector time period (T02; T02, T72) which is a time period including the timing.

In one cycle (T) of the converter carrier, in a first time period divided by the timing, an arrangement pattern (V41, V61, V41) of the instantaneous space vectors adopted by the first inverter except the zero vector (V01) adopted in the first commutation zero vector time period appears M-times (M is an integer equal to or greater than 1).

In the first time period, an arrangement pattern (V42, V62, V42) of the instantaneous space vectors adopted by the second inverter except the zero vector (V02; V02, V72) adopted in the second commutation zero vector time period appears N-times (N is an integer equal to or greater than 2, and different from the M).

A second aspect of the control signal generation device according to the present invention is the first aspect thereof, in which in the second inverter, the first time period has (N−1) non-commutation zero vector time periods (Ts01; Ts1) which are separated from the second commutation zero vector time period (T02; T02, T72) and in which the zero vector (V02; V02, V72) adopted in the second commutation zero vector time period is adopted.

Orders (V42, V62, V42; V62, V42) of vectors used for said instantaneous space vector control of said second inverter in time periods (Tk), each of which is interposed between said second commutation zero vector time period and said non-commutation zero vector time period, are equal to each other.

A third aspect of the control signal generation device according to the present invention is the second aspect thereof, in which: in the first carrier, the same waveform appears the M-times in the first time period (dst·T); and in the second carrier, the same waveform appears the N-times in the first time period.

A fourth aspect of the control signal generation device according to the present invention is the second aspect thereof, in which a second carrier (C2) adopted for the instantaneous space vector control of the second inverter has a cycle equal to a cycle of the converter carrier (C0). In the first time period (dst·T), for the second inverter signal wave, N values (dst(1−V*), drt+dst·V*, drt(1−V*), drt·V*; drt+(⅔)dst+ dst·V*, drt+(⅔)dst−dst·V*, drt+dst·V*, drt(1−V*), drt(⅓+V*), drt(⅓−V*)) are set with respect to each phase, the N values being based on the arrangement pattern.

A fifth aspect of the control signal generation device according to the present invention is the fourth aspect thereof, in which for the second inverter signal wave, (N−1) values (drt+dst/2, drt/2) are further set, the (N−1) values being not based on the arrangement pattern but based on the current conduction ratio.

A second aspect of the direct converting apparatus according to the present invention includes: any one of the first to fifth aspects of the control signal generation device; and the converter (3), the first inverter (4), and the second inverter (5).

Effects Of The Invention

In the first aspect of the method for controlling the direct converting apparatus and the first aspect of the control signal generation device according to the present invention, in the direct converting apparatus, substantial carrier frequencies of the plurality of inverters are made different from each other while performing an operation in synchronization with the converter. Therefore, the degree of freedom in the selection of a carrier in accordance with load characteristics of the inverters is improved.

In the second aspect of the method for controlling the direct converting apparatus and the second aspect of the control signal generation device according to the present invention, the same pattern of the instantaneous space vectors adopted by the second inverter appears twice or more in the first time period. This can contribute to the first aspect of the control method and the first aspect of the control signal generation device.

In the third aspect of the method for controlling the direct converting apparatus and the third aspect of the control signal generation device according to the present invention, the first carrier and the second carrier are individually adopted, to thereby realize the second aspect of the control method and the second aspect of the control signal generation device.

In the fourth aspect of the method for controlling the direct converting apparatus and the fourth aspect of the control signal generation device according to the present invention, the second aspect of the control method and the second aspect of the control signal generation device can be realized while realizing the second carrier without a multiplication of the converter carrier.

In the fifth aspect of the method for controlling the direct converting apparatus and the fifth aspect of the control signal generation device according to the present invention, even when a saw-teeth wave is used for the carrier, the fourth aspect of the control method and the fourth aspect of the control signal generation device can be realized.

In the first aspect of the direct converting apparatus according to the present invention, the effects of the first to fifth aspects of the control method can be obtained.

In the second aspect of the direct converting apparatus according to the present invention, the effects of the first to fifth aspects of the control signal generation device can be obtained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a circuit diagram showing a configuration of a direct converting apparatus to which the present invention is applicable;

BEST MODE FOR CARRYING OUT THE INVENTION

A. Configuration of Direct Converting Apparatus

Figure 2:
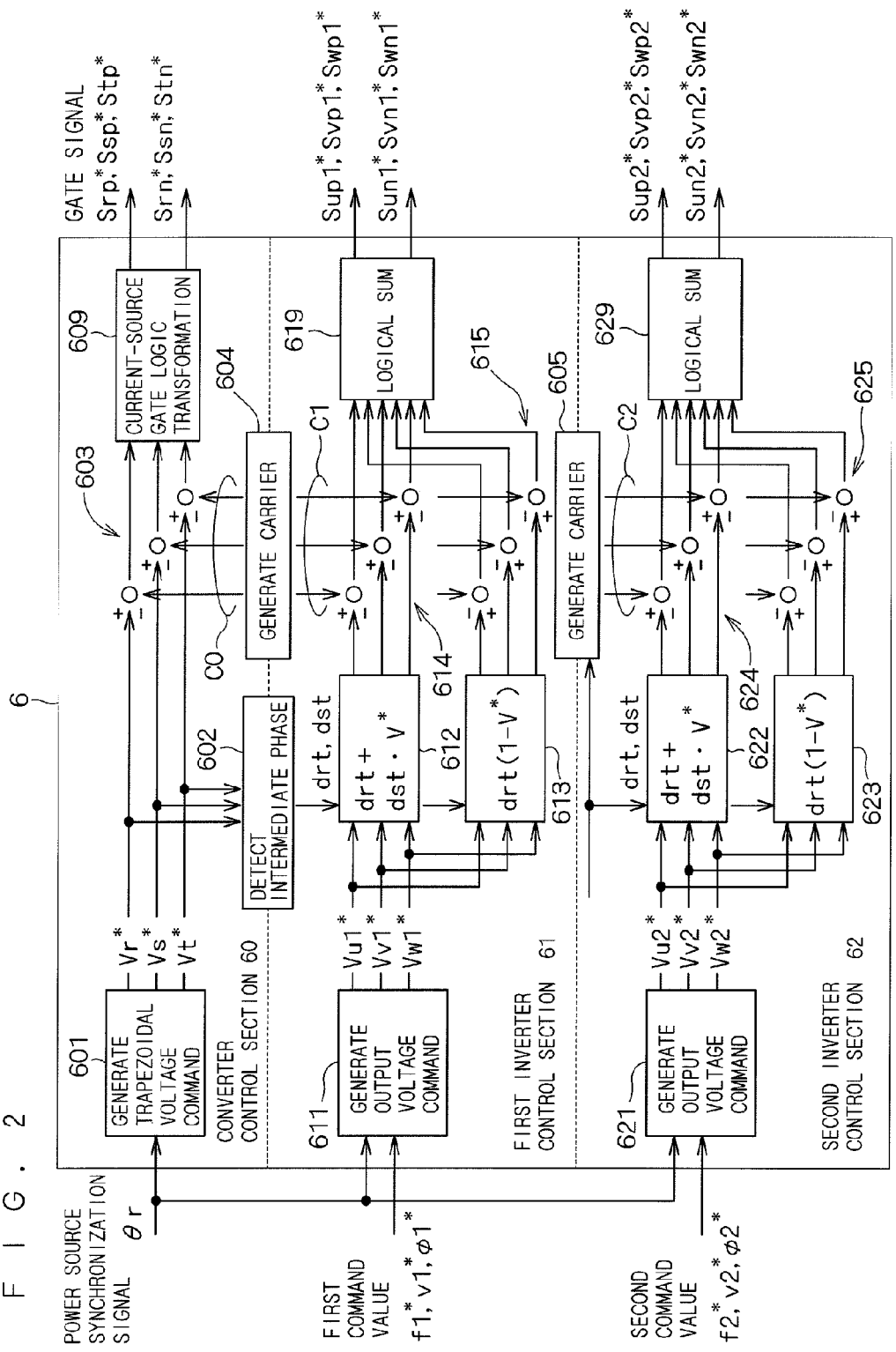
FIG. 2 is a block diagram showing a configuration of a gate signal generation circuit.

FIG. 1 is a circuit diagram showing a configuration of a direct converting apparatus to which the present invention is applicable. The converting apparatus includes a converter 3, inverters 4, 5, and a pair of DC power supply lines L1, L2 which connects the two sides to each other.

The converter 3 rectifies three-phase (here, R-phase, S-phase, and T-phase) AC voltages Vr, Vs, Vt, and outputs them to the pair of DC power supply lines L1, L2. An input capacitor group 2 may be provided between an AC power source 1 and the converter 3. For example, the input capacitor group 2 includes Y-connected three capacitors which receive multi-phase AC voltages Vr, Vs, Vt. Here, a case where a neutral point of the Y-connection is virtually grounded is illustrated.

The converter 3 is a current-source rectifier for example, and operated by a pulse-width modulation. The converter 3 has a plurality of current paths which are connected in parallel with one another between the DC power supply lines L1, L2. One of the current paths of the converter 3 corresponding to the R-phase includes a pair of switching elements Srp, Srn which are connected in series with each other between the DC power supply lines L1, L2. A voltage Vr is applied to a connection point between the switching elements Srp, Srn. One of the current paths of the converter 3 corresponding to the S-phase includes a pair of switching elements Ssp, Ssn which are connected in series with each other between the DC power supply lines L1, L2. A voltage Vs is applied to a connection point between the switching elements Ssp, Ssn. One of the current paths of the converter 3 corresponding to the T-phase includes a pair of switching elements Stp, Stn which are connected in series with each other between the DC power supply lines L1, L2. A voltage Vt is applied to a connection point between the switching elements Stp, Stn.

The switching elements Srp, Ssp, Stp and the switching elements Srn, Ssn, Stn are connected to the DC power supply line L1 side and the DC power supply line L2 side, respectively. Configurations of these switching elements themselves are known, and illustrated in the Kato and Ito, "Improvement of Waveform for a Boost type AC/DC/AC Direct Converter", Institute of Electrical Engineers of Japan, national convention 2007 Mar. 15-17, Part 4, 4-098, for example.

The inverters 4, 5 are voltage-source inverters for example, and both of them are operated by a pulse-width modulation according to an instantaneous space vector control (hereinafter simply referred to as a "vector control"). The inverters 4, 5 are connected in parallel with each other between the DC power supply lines L1, L2, and each of them individually outputs three-phase (here, U-phase, V-phase, and W-phase) AC voltages.

Each of the inverters 4, 5 includes a plurality of current paths which are connected in parallel with one another between the DC power supply lines L1, L2.

One of the current paths of the inverter 4 corresponding to the U-phase includes a pair of switching elements Sup1, Sun1 which are connected in series with each other between the DC power supply lines L1, L2. An output voltage Vu1 is obtained from a connection point between the switching elements Sup1, Sun1. One of the current paths of the inverter 4 corresponding to the V-phase includes a pair of switching elements Svp1, Svn1 which are connected in series with each other between the DC power supply lines L1, L2. An output voltage Vv1 is obtained from a connection point between the switching elements Svp1, Svn1. One of the current paths of the inverter 4 corresponding to the W-phase includes a pair of switching elements Swp1, Swn1 which are connected in series with each other between the DC power supply lines L1, L2. An output voltage Vw1 is obtained from a connection point between the switching elements Swp1, Swn1. One of the current paths of the inverter 5 corresponding to the U-phase includes a pair of switching elements Sup2, Sun2 which are connected in series with each other between the DC power supply lines L1, L2. An output voltage Vu2 is obtained from a connection point between the switching elements Sup2, Sun2. One of the current paths of the inverter 5 corresponding to the V-phase includes a pair of switching elements Svp2, Svn2 which are connected in series with each other between the DC power supply lines L1, L2. An output voltage Vv2 is obtained from a connection point between the switching elements Svp2, Svn2. One of the current paths of the inverter 5 corresponding to the W-phase includes a pair of switching elements Swp2, Swn2 which are connected in series with each other between the DC power supply lines L1, L2. An output voltage Vw2 is obtained from a connection point between the switching elements Swp2, Swn2.

The switching elements Sup1, Svp1, Swp1, Sup2, Svp2, Swp2 are connected to the DC power supply line L1 side. Hereinafter, these switching elements are recognized as high-arm side switching elements. The switching elements Sun1, Svn1, Swn1, Sun2, Svn2, Swn2 are connected to the DC power supply line L2 side. Hereinafter, these switching elements are recognized as low-arm side switching elements. Configurations of these switching elements themselves are known, and illustrated in the Kato and Ito, "Improvement of Waveform for a Boost type AC/DC/AC Direct Converter", Institute of Electrical Engineers of Japan, national convention 2007 Mar. 15-17, Part 4, 4-098.

The inverters 4, 5 are operated under the vector control. Firstly, as for the inverter 4, operations of the switching elements Sup1, Svp1, Swp1, Sun1, Svn1, Swn1 are controlled based on gate signals Sup1*, Svp1*, Swp1*, Sun1*, Svn1*, Swn1* which are control signals. A description will be given based on an assumption that when these gate signals have the logical values "1"/"0", the corresponding switching elements are rendered conducting/non-conducting. Except a so-called dead time, the values of the gate signals Sup1*, Svp1*, Swp1* and the values of the gate signals Sun1*, Svn1, Swn1* are complementary to each other. That is, using a subscript q to represent the subscripts u, v, w, the exclusive logical sum of the signals Sqp1*, Sqn1* is "1".

The subscript x of the vector Vx (x =integer from 0 to 7) which is adoptable in such a vector control is given by 4·Sup1*+2·Svp1*+Swp1. For example, when all of the high-arm side switching elements Sup1, Svp1, Swp1 are non-conducting, all of the low-arm side switching elements Sun1, Svn1, Swn1 are conducting. In this case, x=0 is established, and the inverter 4 is in a vector V0 which is one state of a zero vector.

To the contrary, when all of the high-arm side switching elements Sup1, Svp1, Swp1 are conducting, all of the low-arm side switching elements Sun1, Svn1, Swn1 are non-conducting. In this case, x=7 is established, and the inverter 4 is in a vector V7 which is another state of the zero vector different from the vector V0.

In the inverter 5 as well, a voltage vector is indicated in the same manner. However, in order to distinguish operation states of the inverters 4, 5 from each other, the voltage vector of the inverter 4 is indicated as a vector Vx1 and the voltage vector of the inverter 5 is indicated as a vector Vx2.

Loads M1, M2 are inductive loads, and connected to the inverters 4, 5, respectively. To be specific, the load M1 is a motor having three-phase coils which are Y-connected and to which the voltages Vu1, Vv1, Vw1 are applied. In the same manner, the load M2 is a motor having three-phase coils which are Y-connected and to which the voltages Vu2, Vv2, Vw2 are applied. On the circuit diagram, a resistance component of each of the three-phase coils is shown as a resistor which is connected in series with this coil. Additionally, as for each of the loads M1, M2, a parasitic capacitance is shown as three Y-connected capacitors. Here, a case where a neutral point of the Y-connection is virtually grounded is illustrated.

Hereinafter, a description will be given of a technique in which a carrier (hereinafter also referred to as a "first carrier") used for a pulse-width modulation in the inverter 4 has the same frequency as that of a carrier (hereinafter also referred to as a "converter carrier") used for a pulse-width modulation in the converter 3, and a substantial frequency (including an actual case and a virtual case) of a carrier (hereinafter also referred to as a "second carrier") used for a pulse-width modulation in the inverter 5 is increased to be higher than the frequency of the converter carrier. However, a substantial frequency of the first carrier can also be increased to be higher than the frequency of the converter carrier, as long as it is different from the substantial frequency of the second carrier.

B. Actual Multiplication of Carrier Frequency

FIG. 2 is a block diagram showing a configuration of a gate signal generation device 6. The gate signal generation device 6 includes a converter control section 60, a first inverter control section 61, and a second inverter control section 62.

To the converter control section 60, a power source synchronization signal (hereinafter simply referred to as an "angle") θr indicating a phase angle of the voltage Vr is inputted as a power source synchronization signal, and the converter control section 60 outputs the gate signals Srp*, Ssp*, Stp*, Srn*, Ssn*, Stn*. These gate signals are control signals for controlling the operations of the respective switching elements Srp, Ssp, Stp, Srn, Ssn, Stn of the converter 3.

To the first inverter control section 61, the angle θr, a command value f1* of an operation frequency of the inverter 4, a voltage command value v1*, and a phase command value φ1* (they will be collectively called a "first command value") are inputted, and the first inverter control section 61 outputs the above-mentioned gate signals Sup1*, Svp1*, Swp1*, Sun1*, Svn1, Swn1*.

To the second inverter control section 62, the angle θr, a command value f2* of an operation frequency of the inverter 5, a voltage command value v2*, and a phase command value φ2* (they will be collectively called a "second command value") are inputted, and the second inverter control section 62 outputs the gate signals Sup2*, Svp2*, Swp2*, Sun2*, Syn2*, Swn2*. These gate signals control the operations of the respective switching elements Sup2, Svp2, Swp2, Sun2, Svn2, Swn2 of the inverter 5.

The configuration shown as the "control section 3" in the Japanese Patent Application Laid-Open No. 2007-312589 is adoptable as the configurations of the converter control section 60 and the first inverter control section 61, or the configurations of the converter control section 60 and the second inverter control section 62. The description given below is slightly different from the technique shown in the Japanese Patent Application Laid-Open No. 2007-312589 in terms of the way of expression, and therefore a description will be, though simply, given.

The converter control section 60 includes a trapezoidal voltage command generation section 601, an intermediate phase detection section 602, a comparator 603, a carrier generation section 604, and a current-source signal logic transformation section 609. These serve the same functions as those of a "trapezoidal voltage command signal generation section 11", an "intermediate phase detection section 14", a "comparison section 12", a "carrier signal generation section 15", and a "current-source gate logic transformation section 13" of the Japanese Patent Application Laid-Open No. 2007-312589, respectively.

The trapezoidal voltage command generation section 601 generates voltage commands Vr*, Vs*, Vt* of the converter 3 based on the angle θr and using the voltage Vr as a reference. Each of these voltage commands exhibits a trapezoidal waveform having a cycle of 360 degrees, and these voltage commands are phase-shifted from one another by 120 degrees. This trapezoidal waveform exhibits a trapezoidal wave having a pair of continuous flat zones each having 120 degrees and a pair of inclination regions each having 60 degrees and connecting the pair of flat zones to each other. For example, the center of the inclination region is adopted as a reference of the phase, and the minimum value and the maximum value (these appear in the flat zone) of this waveform are defined as values 0, 1 and represented as $(1-\sqrt{3} \tan \theta)/2$ or $(1+\sqrt{3} \tan \theta)/2$, respectively. Since the method for obtaining the inclination region and advantageous effects thereof are introduced in the Japanese Patent Application Laid-Open No. 2007-312589 and additionally they are not directly related to the present application, a detailed description thereof is omitted.

The intermediate phase detection section 602 selects, from the voltage commands Vr*, Vs*, Vt*, the one having neither the maximum phase which takes the maximum value nor the minimum phase which takes the minimum value, in other words, selects the one exhibiting the inclination region.

For example, assumed is a case where the voltage commands Vr*, Vt* take the flat zones exhibiting the maximum value and the minimum value, respectively, while the voltage command Vs* takes the inclination region. In the following, if not otherwise specified, it is assumed that the direct converting apparatus and the gate signal generation circuit 6 are operated under this condition. Such an assumption is adopted without loss of generality, because the voltage commands Vr*, Vs*, Vt* exhibit the identical waveforms except for the phase shifts.

In such a case, the intermediate phase detection section 602 selects the voltage command Vs*. The ratio between the value Vr*−Vs* (=1−Vs*) and the value Vs*−Vt* (=Vs*) is the ratio between a time period in which the switching element Srp is conducting and a time period in which the switching element Ssp is conducting. That is, a current conduction ratio of the converter 3 corresponding to the S-phase is determined by the voltage command Vs* which is selected by the intermediate phase detection section 602. The current conduction ratio at which the switching element Srp is conducting and the current conduction ratio at which the switching element Ssp is conducting are represented by the values drt, dst(drt+dst=1), respectively. The intermediate phase detection section 602 outputs the values drt, dst.

The carrier generation section 604 outputs a converter carrier C0 which takes the minimum value and the maximum value (in the above-described example, 0 and 1, respectively) of the voltage commands Vr*, Vs*, Vt*. For example, the converter carrier C0 is a triangular wave.

The comparator 603 compares the voltage commands Vr*, Vs*, Vt* with the converter carrier C0. Based on a result of this comparison, the current-source signal logic transformation section 609 outputs gate signals (hereinafter also referred to as a "converter gate signal") Srp*, Ssp*, Stp*, Srn*, Ssn*, Stn* for the converter 3. Accordingly, the comparator 603 and the current-source signal logic transformation section 609 can be collectively recognized as a signal generation section which generates the converter gate signal for performing a pulse-width control on the converter 3 by using the result of comparison between the converter carrier C9 and the voltage commands Vr*, Vs*, Vt*.

A logic transformation for obtaining the gate signals Srp*, Ssp*, Stp*, Srn*, Ssn*, Stn* based on the result of comparison between the phase voltage command and the carrier is known in the Japanese Patent Application Laid-Open No. 2007-312589 and Japanese Patent Application Laid-Open No. 9-182458 (1997) for example, and therefore a detailed description thereof is omitted.

Since the converter 3 is a current-source rectifier, an operation is performed in which, in principle, the high-arm side switching element corresponding to the maximum phase and the high-arm side switching element corresponding to the intermediate phase are alternately rendered conducting while the low-arm side switching element corresponding to the minimum phase is rendered conducting.

In a case where there are diode elements in all of the switching elements, all of the switching elements may sometimes be rendered conducting to perform a rectification by the function of these diode elements. However, since it is not an operation of the pulse-width modulation, the rectifying operation is excluded from the consideration herein.

The first inverter control section 61 includes an output voltage command generation section 611, computation sections 612, 613, comparators 614, 615, and a logical sum computation section 619. These serve the same functions as those of the "output voltage command signal generation section 21", the "computation sections 22, 23", the "comparison section 24", and the "logical sum computation section 25" of the Japanese Patent Application Laid-Open No. 2007-312589, respectively.

The output voltage command generation section 611 outputs phase voltage commands Vu1*, Vv1*, Vw1* based on the first command value and the angle θr. These are command values of the output voltages Vu1, Vv1, Vw1 (see FIG. 1) of the inverter 4.

Based on the phase voltage commands Vu1*, Vv1*, Vw1* and the values drt, dst, the computation sections 612, 613 generate signal waves (signal waves) to be compared with the first carrier C1. The first carrier C1 is synchronized with the converter carrier C0, and takes the value drt at a time when the converter carrier C0 takes the value drt. For example, the converter carrier C0 is adopted as the first carrier C1. In order to avoid complication of the drawings, the input of the values drt, dst to the computation section 613 is indicated simply by only the arrow entering the computation section 613 from the above.

In the Japanese Patent Application Laid-Open No. 2007-312589, the computations based on the values drt, dst and the phase voltage commands Vu1*, Vv1*, Vw1* are represented by drt+dst(1−V*), drt(1−V*). This is because the reference character V* represents the voltage vector. The computations in the present application are also shown in accordance with the Japanese Patent Application Laid-Open No. 2007-312589.

The comparator 614 compares a result of the computation section 612 with the first carrier C1, and the comparator 615 compares a result of the computation section 613 with the first carrier C1. Based on results of these comparison, the logical sum computation section 619 outputs the gate signals Sup1*, Svp1*, Swp1*, Sun1*, Svn1*, Swn1*. Accordingly, the comparators 614, 615 and the logical sum computation section 619 can be collectively recognized as a signal generation section which generates a first inverter gate signal based on the result of the comparison between the first carrier C1 and the signal waves drt+dst(1−V*), drt(1−V*).

In this manner, according to the Japanese Patent Application Laid-Open No. 2007-312589, to obtain the gate signal for controlling the converter 3, the trapezoidal wave voltage commands Vr*, Vs*, Vt* are compared with the converter carrier C0, and to generate the gate signal for controlling the inverter 4, the result of the computation using the current conduction ratios drt, dst of the converter 3 and the phase voltage commands Vu1*, Vv1*, Vw1* of the inverter 4 is compared with the first carrier C1. Thereby, a direct conversion is performed while a commutation in the converter 3 is caused in a time period of the zero vector of the inverter 4. Details of the operation are introduced in the Japanese Patent Application Laid-Open No. 2007-312589, and thus the details will be omitted.

In a case where the converter carrier C0 is used also as the first carrier C1 as described above, the carrier generation section 604 may be recognized as being included in the first inverter control section 61.

The second inverter control section 62 includes an output voltage command generation section 621, computation sections 622, 623, comparators 624, 625, and a logical sum computation section 629. These serve the same functions as those of the output voltage command generation section 611, the computation sections 612, 613, the comparators 614, 615, and the logical sum computation section 619 of the first inverter control section 61, respectively. Phase voltage commands Vu2*, Vv2*, Vw2* outputted by the output voltage command generation section 621 are command values of the output voltages Vu2, Vv2, Vw2 (see FIG. 1) of the inverter 5.

Moreover, the second inverter control section 62 includes a carrier generation section 605, and generates a second carrier C2. Considering that the carrier generation section 604 is included in the first inverter control section 61, it can be recognized that the gate signal generation device 6 shown in FIG. 2 adopts such a configuration that the number of the "inverter control sections" is simply increased by one in the "control section 3" shown in the Japanese Patent Application Laid-Open No. 2007-312589.

The second carrier C2 will be detailed later, and an operation of the first inverter control section 61 will firstly be described.

Figure 3:
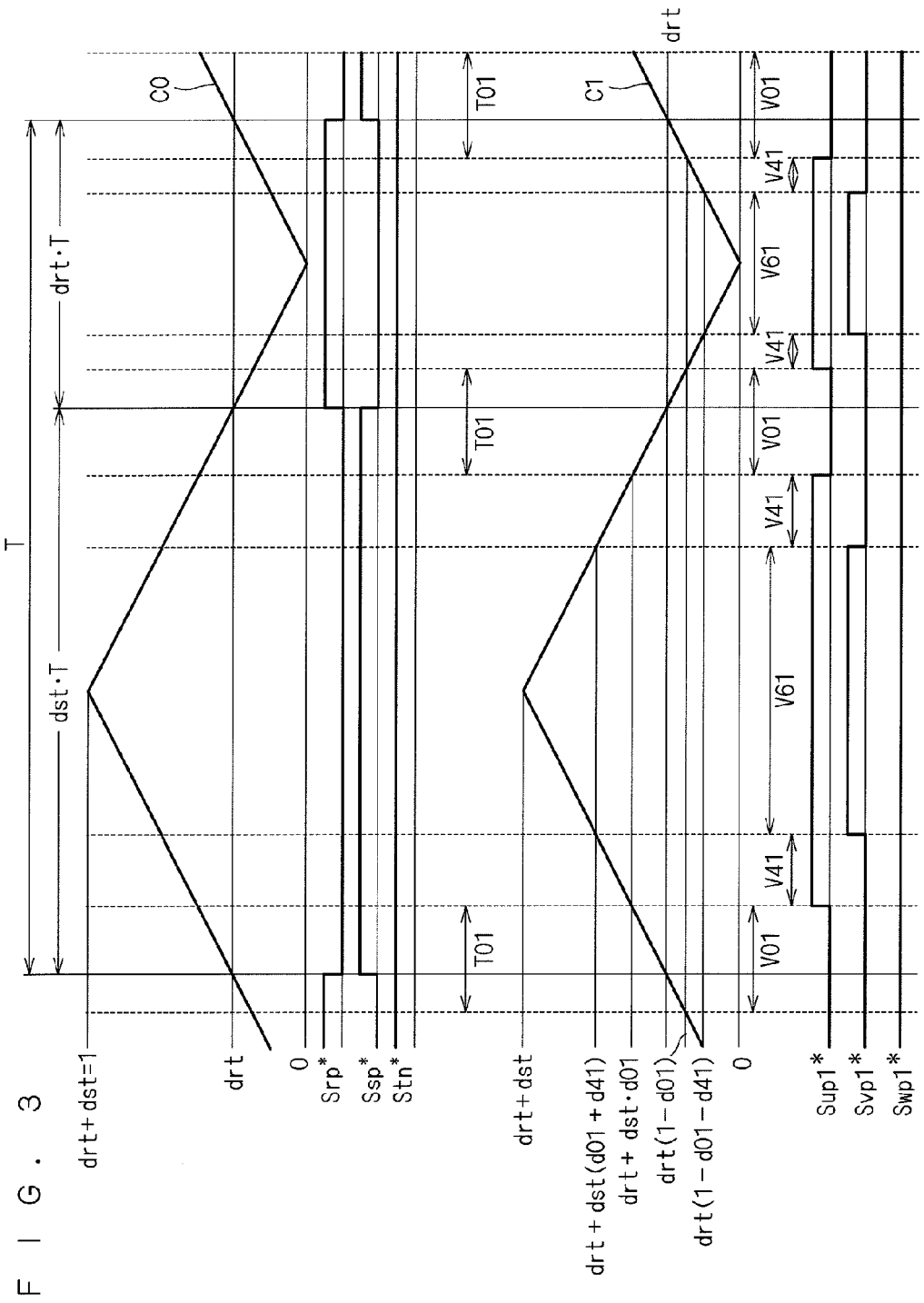
FIG. 3 is a graph showing waveforms of respective carriers and gate signals.

FIG. 3 is a graph showing waveforms of the converter carrier C0, the converter gate signals Sip*, Ssp*, Stn*, the first carrier C1, and the gate signals Sup1*, Svp1*, Swp1* (hereinafter referred to as a "first inverter gate signal") for the inverter 4.

One cycle T of the converter carrier C0 is divided by the values dst, drt which indicate the commutation ratios, into a time period dst·T and a time period drt·T, and the commutation in the converter 3 is caused at a timing of the division. As described above, the minimum value and the maximum value of the converter carrier C0 are 0, 1, respectively, and dst+drt=1 is established. Therefore, specifically, the commutation in the converter 3 is performed at a timing when the converter carrier C0 takes the value drt. In the time period dst·T, the converter gate signal Ssp* is activated corresponding to the S-phase which is the intermediate phase, and in the time period drt·T, the converter gate signal Srp* is activated corresponding to the R-phase which is the maximum phase.

In order that the inverter 4 adopts a zero vector V01 around the timing when the commutation is caused in the converter 3, the signal wave and the first carrier C1 are compared with each other. Here, when it is assumed that the W-phase is the minimum phase and a triangular wave is adopted as the first carrier C1, only vectors V01, V41, V61 are adopted in the control of the inverter 4. Thus, the description will continue with defining time periods in which the vectors V01, V41, V61 are adopted as time periods d01, d41, d61(=1−d01−d41), respectively. The time periods d01, d41, d61 are determined by the phase voltage commands Vu1*, Vv1*, Vw1* (see FIG. 2).

To realize the commutation in the converter 3 at a zero current, it is necessary that the vector V0 is adopted in the inverter 4 at a time point when the converter carrier C0 takes the value drt. The first carrier C1 varies within a range of the values 0 to drt which has a width of drt when equal to or less than the value drt, and varies in a range of the values drt to 1 which has a width of dst when equal to or more than the value drt.

Thus, signal waves drt+dst·V* (here, V*=d01, d01+d41, d01+d41+d61) with respect to the time period dst·T are generated by the computation section 612. These signal waves are compared with the first carrier C1 by the comparator 614, and the result of the comparison is given to the logical sum computation section 619.

Also, signal waves drt (1−V*) (here, V*=d01, d01+d41, d01+d41+d61) with respect to the time period drt·T are generated by the computation section 613. These signal waves are compared with the first carrier C1 by the comparator 615, and the result of the comparison is given to the logical sum computation section 619.

The logical sum computation section 619 obtains the logical sum of the results of the comparison in the comparators 614, 615 with respect to each of the U-phase, the V-phase, and the W-phase, and outputs the first inverter gate signals Sup1*, Svp1*, Swp1*. For example, by the first carrier C1 taking either one of a value equal to or more than the signal wave drt+dst·d01 and a value equal to or less than the signal wave drt(1−d0), the first inverter gate signal Sup1* is activated.

In this manner, the timings when the vectors V01, V41, V61 are switched are determined by the comparison between the signal waves drt+dst·V*, drt(1−V*) and the first carrier C1. Since the time period T01 in which the zero vector V0 is adopted includes the timing of the commutation in the converter 3, the commutation in the converter 3 at a so-called zero current can be realized. In the following, the time period (for example, the time period T01 mentioned above) in which the timing of the commutation in the converter 3 is included and additionally the zero vector is adopted will be referred to as a "commutation zero vector time period".

Figure 4:
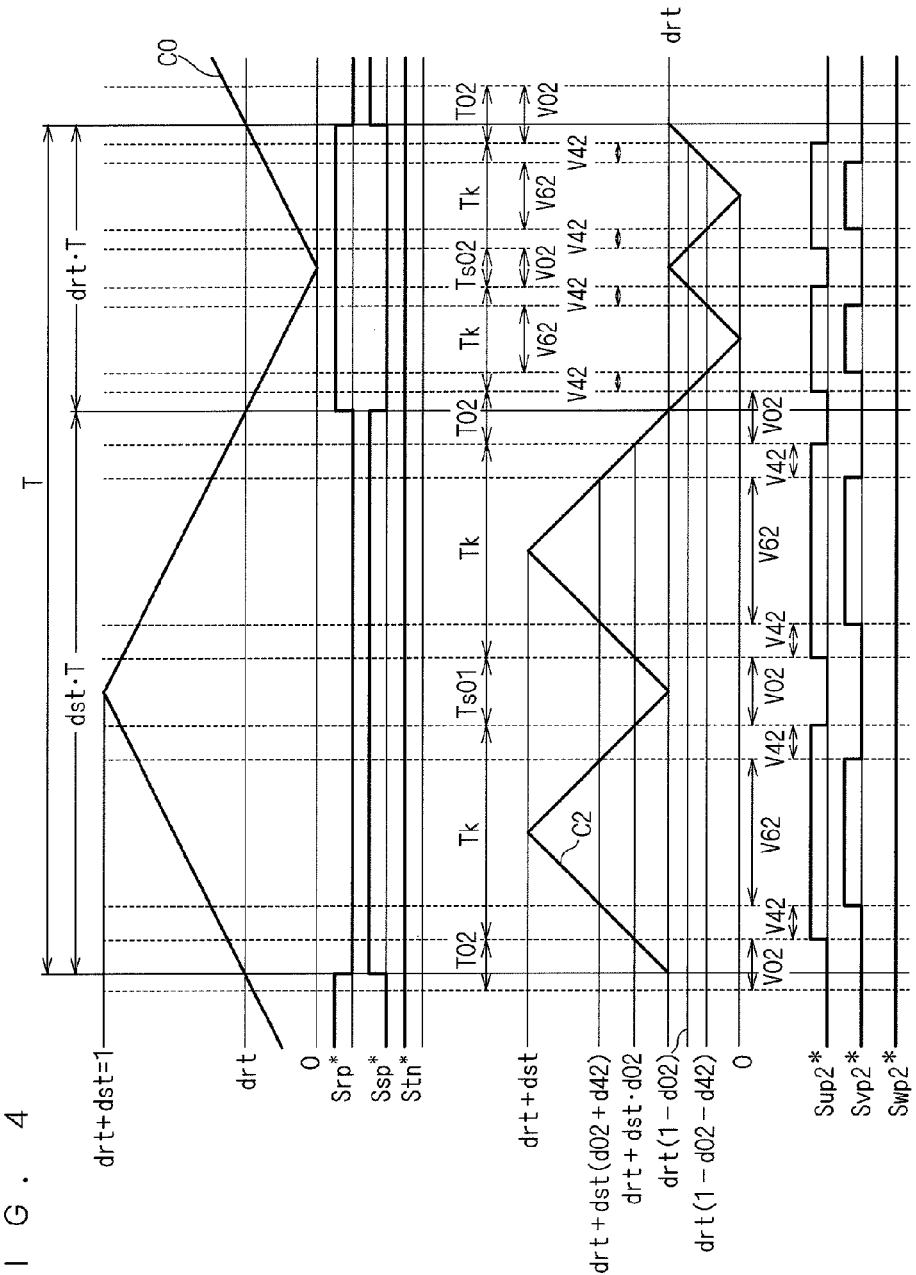
FIG. 4 is a graph showing waveforms of respective carriers and gate signals.

Next, an operation of the second inverter control section 62 will be described. FIG. 4 is a graph showing waveforms of the converter carrier C0, the converter gate signals Srp*, Ssp*, Stn*, the second carrier C2, and the gate signals Sup2*, Svp2*, Swp2* hereinafter also referred to as a "second inverter gate signal") for the inverter 5.

The point that one cycle T of the converter carrier C0 is divided into the time period dst·T and the time period drt·T, and the converter gate signals Srp*, Ssp*, Stn*, are the same as described in the operation of the first inverter control section 61.

In order that the inverter 5 can adopt a zero vector V02 around the timing when the commutation is caused in the converter 3, the signal waves are compared with the second carrier C2. The second carrier C2 is synchronized with the converter carrier C0, and takes the value drt at a time point when the converter carrier C0 takes the value drt. With reference also to FIG. 3, the first carrier C1 shows the same waveform only once in each of the time periods dst·T, drt·T, while the second carrier C2 shows the same waveform twice in the time period dst·T.

To be specific, the first carrier C1 exhibits a triangular wave which changes while making one round trip between the values drt and 1 in the time period dst·T, whereas the second carrier C2 exhibits a triangular wave which changes while making two round trips between the values drt and 1 in the time period dst·T. In the same manner, the first carrier C1 exhibits a triangular wave which changes while making one round trip between the values drt and 0 in the time period drt·T, whereas the second carrier C2 exhibits a triangular wave which changes while making two round trips between the values drt and 0 in the time period drt·T.

Considering a case where the second carrier C2 has a triangular wave similarly to the first carrier C1 and the W-phase adopts the minimum phase in the control of the inverter 5 similarly to the control of the inverter 4, only the vectors V02, V42, V62 are adopted. Thus, the description will continue with defining the time periods in which the vectors V02, V42, V62 as time periods d02, d42, d62(=1−d02−d42), respectively. The time periods d02, d42, d62 are determined by the phase voltage commands Vu2*, Vv2*, Vw2*.

The signal waves drt+dst·V* (here, V*=d02, d02+d42, d02+d42+d62) with respect to the time period dst·T are generated by the computation section 622. These signal waves are compared with the second carrier C2 by the comparator 624, and the result of the comparison is given to the logical sum computation section 629.

Also, the signal waves drt (1−V*) (here, V*=d02, d02+d42, d02+d42+d62) with respect to the time period drt·T are generated by the computation section 623. These signal waves are compared with second carrier C2 by the comparator 625, and the result of the comparison is given to the logical sum computation section 629.

The logical sum computation section 629 obtains the logical sum of the results of the comparison in the comparators 624, 625 with respect to each of the U-phase, the V-phase, and the W-phase, and outputs the second inverter gate signals Sup2*, Svp2*, Swp2*.

Similarly to the first carrier C1, the second carrier C2 takes the value drt at the time point when the converter carrier C0 takes the value drt. Thus, the vector V02 is adopted in a commutation zero vector time period T02 including the timing when the commutation is caused in the converter 3.

Since the second carrier C2 repeatedly exhibits the same change as of the first carrier C1 twice in each of the time periods dst·T, drt·T, the number of times the second inverter gate signals Sup2*, Svp2*, Swp2* are activated in each of the time periods dst·T, drt·T is twice the number of times the first inverter gate signals Sup1*, Svp1*, Swp1* are activated.

Accordingly, an arrangement pattern (V42→V62→V42) of the vectors adopted by the inverter 5 except the zero vector V02 repeatedly appears twice in each of the time periods dst·T, drt·T.

Since the inverters 4, 5 are operated in the above-described manner, a carrier frequency in the inverter 5 is different from a carrier frequency in the inverter 4. Thus, according to this embodiment, the degree of freedom in the selection of a carrier is improved in accordance with the characteristics of the loads M1, M2 of the inverters 4, 5, respectively.

Except at this timing, the second carrier C2 takes the value drt, too, and thus there is a time period in which the zero vector V02 is adopted. Such a time period in which the timing of the commutation in the converter 3 is not included and additionally the zero vector adopted in the commutation zero vector time period is adopted, will be referred to as a "non-commutation zero vector time period".

The zero vector adopted in the non-commutation zero vector time period and the zero vector adopted in the commutation zero vector time period are in common Therefore, if the non-commutation zero vector time period and the commutation zero vector time period are continuous with each other, they cannot be distinguished from each other and integrally include the timing of the commutation in the converter 3, which is different from the above description. Thus, the non-commutation zero vector time period must be separated from the commutation zero vector time period.

More specifically, in the time period dst·T, the non-commutation zero vector time period Ts01 is separated from the commutation zero vector time period T02, and in the time period drt·T, the non-commutation zero vector time period Ts02 is separated from the commutation zero vector time period T02.

The second carrier C2 is a triangular wave, and because of its symmetry, the orders (V42→V62→V42) of the vectors adopted in time periods Tk each interposed between the commutation zero vector time period T02 and the non-commutation zero vector time period Ts01 are equal to one another (time period dst·T). Since the orders of the vectors adopted in the time periods Tk are equal to one another, an arrangement pattern of vectors except the zero vector V02 adopted in the commutation zero vector time period T02 can be repeated.

Moreover, since the length of the time period Tk is the same, an occurrence pattern can be obtained with good symmetry. The same is true for the order of the vectors adopted in the time periods Tk each interposed between the commutation zero vector time period T02 and the non-commutation zero vector time period Ts02, and for the symmetry of the vector arrangement pattern (time period drt·T).

In a special case, it can be assumed that d01+d41+d61<1 is established in the inverter 4, or d01+d41+d61<1 is established in the inverter 5. In this case, the signal wave drt+dst·V* is less than 1, and the signal wave drt(1−V*) is more than 0. A time period in which the first carrier C1 adopts a zero vector V71 exists around the position at which the first carrier C1 becomes local maximum or local minimum. A time period in which the second carrier C2 adopts a zero vector V72 exists around the position at which the second carrier C2 becomes local maximum or local minimum.

In this case, taking the inverter 5 as an example, an arrangement pattern of vectors adopted in the commutation zero vector time period T02 except the zero vector V02 is V42→V62→V72→V62→V42.

Since the zero vector V72 is not adopted in the commutation zero vector time period T02, the time period in which the zero vector V72 is adopted is not recognized as the non-commutation zero vector time period. Therefore, the orders (V42→V62→V72→V62→V42) of the vectors adopted in the time periods Tk are equal to one another.

In order that the frequency of the first carrier C1 and the frequency of the second carrier C2 adopted in the inverters 4, 5 can be different from each other, it suffices that at least the second carrier C2 is generated by multiplying the converter carrier C0.

Figure 5:
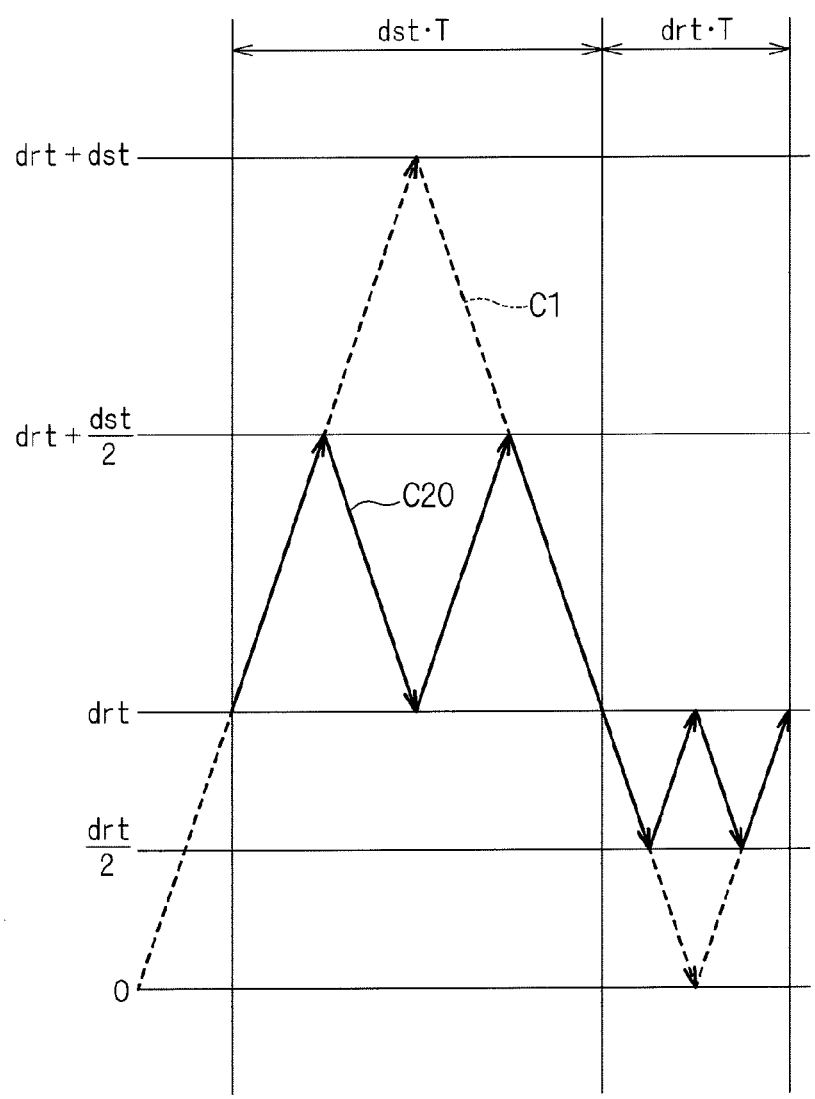
FIG. 5 is a graph conceptually showing an operation of a carrier generation section.

FIG. 5 is a graph conceptually showing operations of the carrier generation sections 604, 605. The first carrier C1 and an original second carrier C20 are illustrated with the broken line and the solid line, respectively. The original second carrier C20 is subjected to normalization centered at the value drt, thus obtaining the second carrier C2.

For example, each of the carrier generation sections 604, 605 has a count-up function for increasing the value with elapse of time, and a count-down function for decreasing the value with elapse of time.

The carrier generation section 604 continues to count up from the value zero, and on counting an upper limit value (drt+dst) (here, the value 1), counts down. When a lower limit value 0 is obtained by continuing counting down, the carrier generation section 604 counts up. Thus, the first carrier C1 can be generated. Needless to say, such generation may be applied to the generation of the converter carrier C0, and the converter carrier C0 may be diverted to the first carrier C1.

The carrier generation section 605 continues to count up from the value drt, and on counting an upper limit value (drt+dst/2), counts down. When the value drt is obtained by continuing counting down, the carrier generation section 605 counts up. When the upper limit value (drt+dst/2) is counted the second time, counting down is conducted until the lower limit value drt/2 is obtained. After the lower limit value drt/2 is obtained, counting up is conducted. When the value drt is obtained by continuing counting up, counting down is conducted. When the lower limit value drt/2 is counted the second time, counting up is conducted until the upper limit value (drt+dst/2) is obtained. The original second carrier C20 is obtained by performing these counting up and counting down.

In order to normalize the maximum value and the minimum value of the original second carrier C20 to drt+dst (=1) and 0, respectively, a waveform of the original second carrier C20 is magnified twice with the value drt serving as the center thereof.

In the second carrier C2 obtained in this manner, the same waveform (here, a triangular wave) appears twice in the time period dst·T. The same is true in the time period drt·T, too.

The carrier generation section 604 need not have the values drt, dst inputted thereto, because the maximum value and the minimum value (here, 1 and 0, respectively) are fixed values. On the other hand, the carrier generation section 605 need generate and normalize the original second carrier C20, and the values drt, dst are inputted thereto similarly to the computation sections 622, 623.

Alternatively, the second inverter gate signals Sup2*, Svp2*, Swp2* shown in FIG. 4 are obtained by adopting the original second carrier C20 as the second carrier C2 and taking the value drt+(dst/2)·V*, drt−(dst/2)·V* as signal waves generated by the computation sections 622, 623, respectively.

In the second carrier C2 generated in this manner, because of its symmetry, the total length of the time periods d02, d42, d62 is maintained, even in comparison with a case where the converter carrier C0 is used as the second carrier. Each of these time periods has its length halved, because the number of times it appears is doubled.

Figure 6:
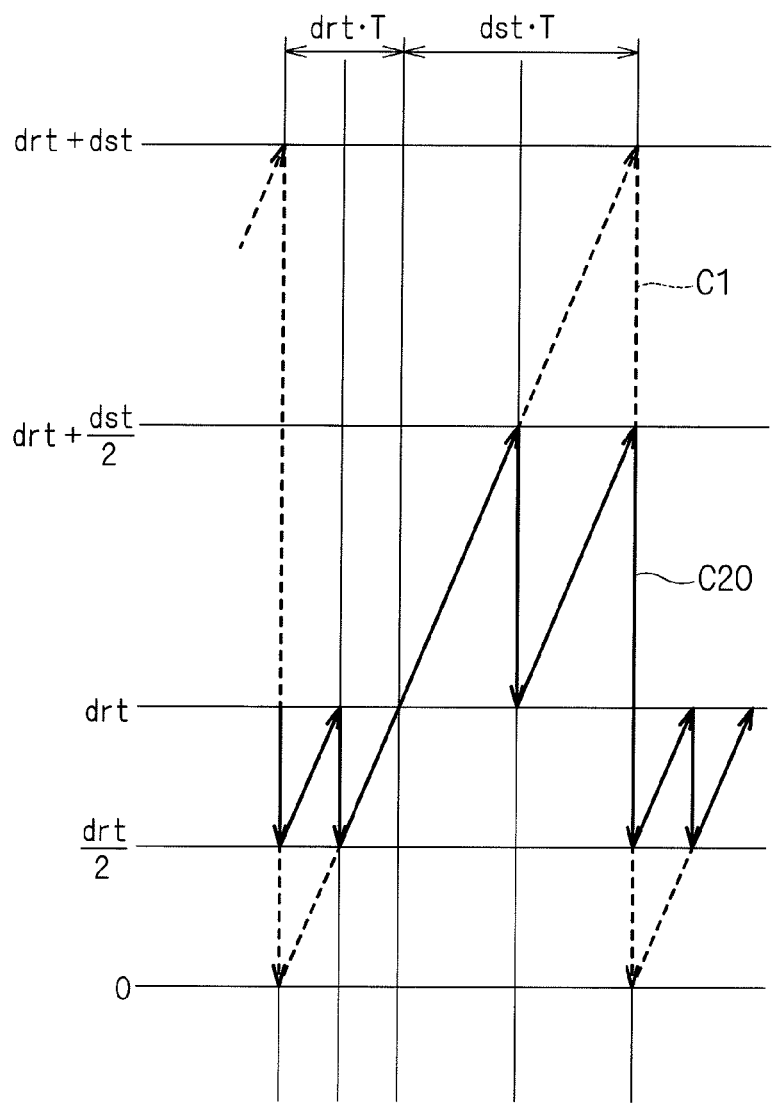
FIG. 6 is a graph conceptually showing an operation of the carrier generation section.

A saw-teeth wave may be adopted as the converter carrier C0, the first carrier C1, and the second carrier C2. FIG. 6 is a graph conceptually showing operations of the carrier generation sections 604, 605 in a case where a saw-teeth wave is adopted as these carriers. In a case where a saw-teeth wave is adopted as these carriers, the carrier generation sections 604, 605 do not need any one of the count-up function and the count-down function. Here, a description will be given taking a pattern of the saw-teeth wave not requiring the count-down function as an example.

The carrier generation section 604 continues to count up from the value 0, and on counting the upper limit value (drt+dst) (here, the value 1), forcibly sets the counted value to the lower limit value 0. Thereby, the first carrier C1 is obtained.

The carrier generation section 605 continues to count up from the lower limit value drt/2, and on counting the value drt, forcibly sets the counted value to the lower limit value drt/2. Counting up is conducted again, and when the value drt is counted the second time, counting up is continued until the upper limit value drt+dst/2 is obtained. When the upper limit value drt+dst/2 is obtained, the counted value is forcibly set to the value drt. Counting up is conducted again, and when the upper limit value drt+dst/2 is counted the second time, the counted value is forcibly set to the lower limit value drt/2.

As mentioned in the last of "A. Configuration of Direct Converting Apparatus", similarly to the second carrier C2, the first carrier C1 may be obtained by multiplying the converter carrier C0. Generally, in a case where the same pattern of vectors adopted by the inverter 4 appears M-times (M is an integer equal to or greater than 1) and the same pattern of vectors adopted by the inverter 5 appears N-times (N is an integer equal to or greater than 2 and different from M mentioned above) in each of the time periods dst·T, drt·T, the degree of freedom in the selection of a carrier in accordance with the characteristics of the loads M1, M2 of the respective inverters 4, 5 is improved. For example, in each of the time periods dst·T, drt·T, the first carrier C1 in which the same waveform appears M-times and the second carrier C2 in which the same waveform appears N-times are adopted, and thereby the repetition of the vector arrangement pattern described above can be realized while using the signal wave similar to that of the Japanese Patent Application Laid-Open No. 2007-312589.

These first carrier C1 and second carrier C2 can be generated by the same process as that shown in FIGS. 5 and 6, though the number of repetitions thereof is different.

C. Virtual Multiplication of Carrier Frequency by Increase of Signal Wave

As shown in the foregoing section B, when the signal wave to be compared with the first carrier C1 and the second carrier C2 is generated in the same manner as the Japanese Patent Application Laid-Open No. 2007-312589, the frequency of the first carrier C1 and the frequency of the second carrier C2 must be different from each other. For example, at least either one of them adopts a frequency different from the frequency of the converter carrier C0. However, by devising a method for generating the signal wave, the converter carrier C0 can serve also as the second carrier C2. This causes an advantageous effect that the carrier generation section 605 can be omitted.

In this section, a description will be given of an operation of the inverter 5 in a case where the same carrier is used for both the pulse-width modulations in the inverters 4, 5 by using the signal wave devised in the above-described manner. In the following, a description will be given particularly of a case where the converter carrier C0 serves not only as the second carrier C2 but also as the first carrier C1. Therefore, in the following, the carrier used for the pulse-width modulations in the inverters 4, 5 is simply referred to as the carrier C0.

Needless to say, the carrier used in both of the inverters 4, 5, as long as it is synchronized with the converter carrier C0, and the value drt is taken at the timing of the commutation in the converter 3, may have a frequency of an integer multiple of the frequency of the converter carrier C0.

Alternatively, as shown in the foregoing section B using the second carrier C2, the inverter 4 may use the first carrier C1 which is obtained by multiplying the converter carrier C0.

(c-1) Case where the carrier is a triangular wave and N=2.

As described above, the vectors adopted by the inverter 5 except the zero vector V02 repeat the same pattern N-times in each of the time periods dst·T, dst·T. In the following, a case of N=2 will be firstly described.

Figure 7:
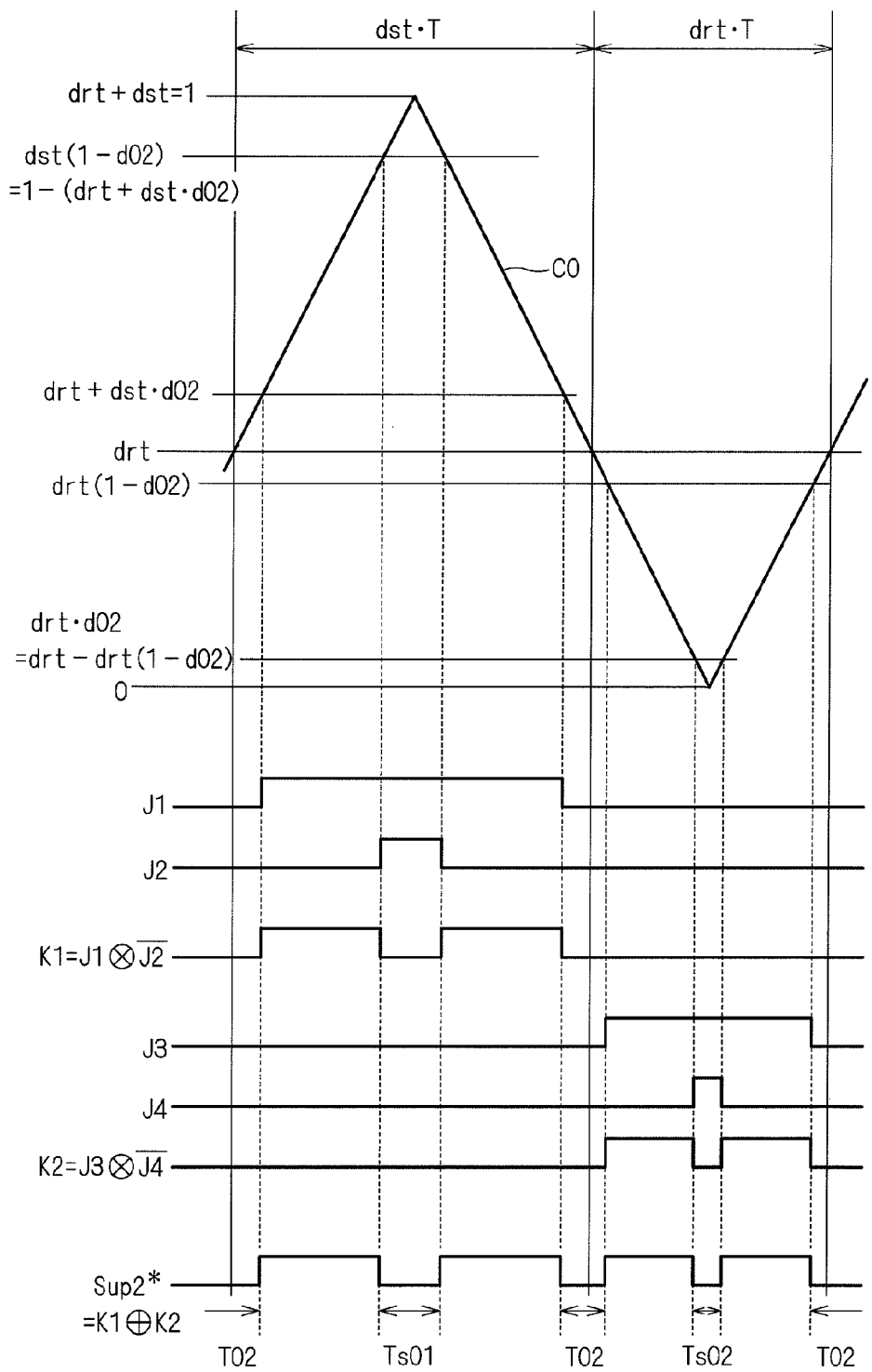
FIG. 7 is a graph showing waveforms of a carrier and a gate signal.

FIG. 7 is a graph showing the carrier C0 and the second inverter gate signal Sup2*. Here, in order to avoid complication, the second inverter gate signals Svp2*, Swp2* are omitted. The number of signal waves which are set based on the arrangement pattern of adopted vectors is 2 N (=4) for each phase.

To be specific, for the U-phase, there are set two signal waves drt+dst·d02, dst(1−d02) which can be taken by the carrier C0 in the time period dst·T, and two signal waves drt(1−d02), drt·d02 (=drt−drt(1−d02)) which can be taken by the carrier C0 in the time period drt·T.

In the same manner, for the V-phase, there are set two signal waves drt+dst(d02+d04), dst(1−d02−d04) which can be taken by the carrier C0 in the time period dst·T, and two signal waves drt(1−d02−d04), drt(d02+d04) which can be taken by the carrier C0 in the time period drt·T (these signal waves are not shown).

For the W-phase, there are set two signal waves drt+dst(d02+d04+d06), dst(1−d02−d04−d06) which can be taken by the carrier C0 in the time period dst·T, and two signal waves drt(1−d02−d04−d06), drt(d02+d04+d06) which can be taken by the carrier C0 in the time period drt·T (these signal waves are not shown).

Only when the carrier C0 takes the signal wave dst(1−d02) or higher, a logical value J2 is "H" (activated). Only when the carrier C0 takes the signal wave drt+dst·d02 or higher, a logical value J2 is "H". Only when the carrier C0 takes the signal wave drt(1−d02) or lower, a logical value J3 is "H". Only when the carrier C0 takes the signal wave drt·d02 or lower, a logical value J4 is "H".

As clearly seen in comparison with the graphs shown in FIG. 3, the logical sum of the logical values J1, J3 corresponds to the first inverter gate signal Sup1*. In other words, a time period in which the logical sum of the logical values J1, J3 is "L" corresponds to the commutation zero vector time period T01. Additionally, as clearly seen in comparison with the graphs shown in FIG. 4, a time period in which the logical value J2 is "H" and a time period in which the logical value J4 is "H" correspond to the non-commutation zero vector time periods Ts01, Ts02, respectively.

Thus, the second inverter gate signal Sup2* in the time period dst·T is obtained as a logical value K1 which is the logical product (indicated by x enclosed in o in the drawing: hereinafter, the same applies) of the logical value J1 and the inverse of the logical value J2 (in the drawing, the overbar represents the logical inverse: hereinafter, the same applies). The second inverter gate signal Sup2* in the time period drt·T is obtained as a logical value K2 which is the logical product of the logical value J3 and the inverse of the logical value J4. Accordingly, the second inverter gate signal Sup2* is obtained as the logical sum (indicated by + enclosed in o in the drawing: hereinafter, the same applies) of the logical value K1 and the logical value K2. The other second inverter gate signals Svp2*, Swp2* are obtained in the same manner.

The carrier C0 is a triangular wave which takes the minimum value drt and the maximum value drt+dst=1 in the time period dst·T. Since the signal wave dst(1−d02) is equal to the value 1−(drt+dst·d02), the total length of time periods in which the carrier C0 takes a value between the minimum value drt (in the time period dst·T) and the signal wave drt+dst·d02 is equal to the length of a time period in which the carrier C0 takes a value between the maximum value 1 (in the time period dst·T) and the signal wave dst(1−d02). Thus, an arrangement pattern with good symmetry can be obtained.

Figure 8:
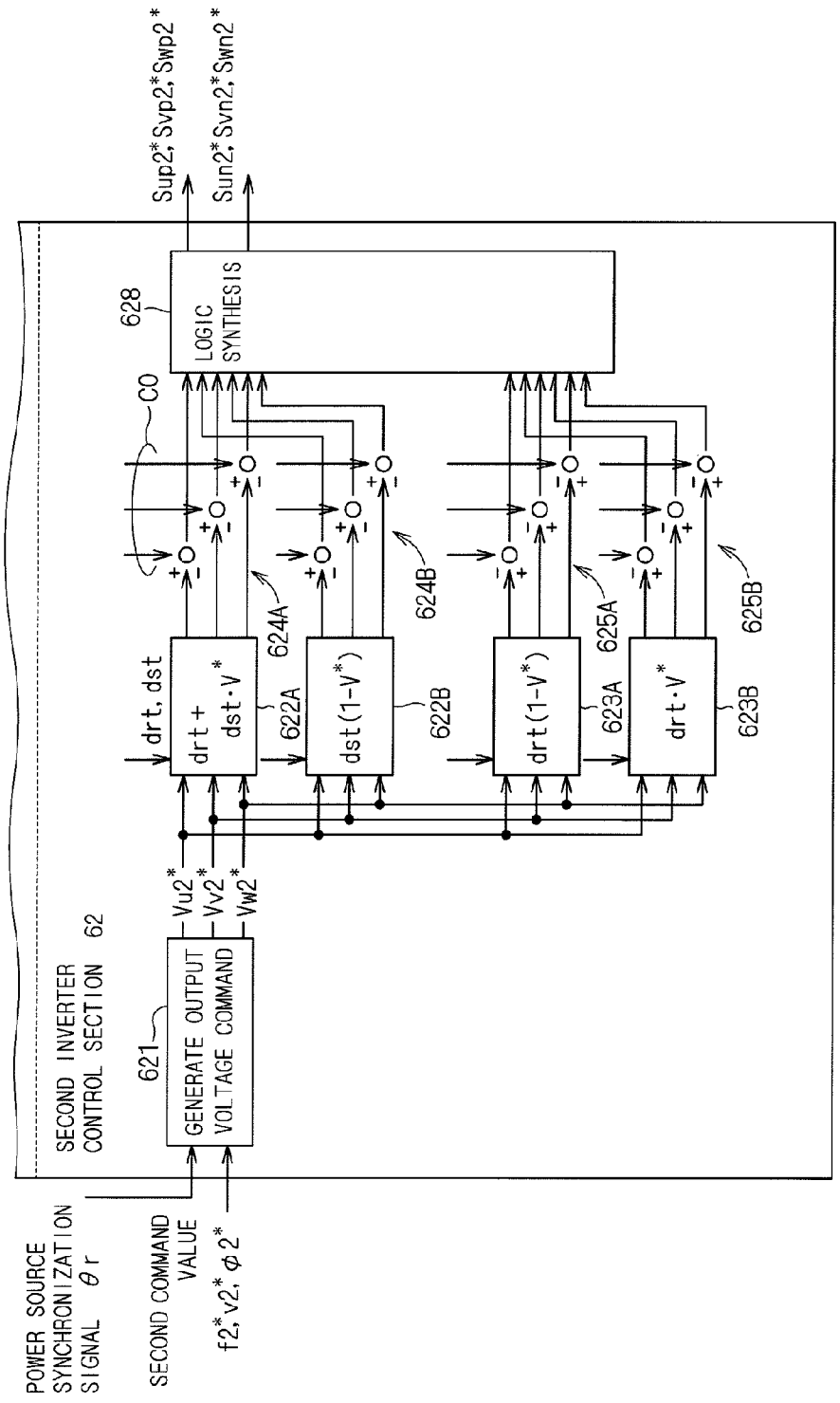
FIG. 8 is a block diagram showing a configuration of a second inverter control section.

FIG. 8 is a block diagram showing a configuration of the second inverter control section 62 in a case where the number of signal waves used per one phase is 2 N in this manner. Similarly to the configuration shown in FIG. 2, the output voltage command generation section 621 is provided, and the phase voltage commands Vu2*, Vv2*, Vw2* are obtained therefrom. Computation sections 622A, 623A generate the signal waves drt+dst·V*, drt(1−V*), respectively, similarly to the computation sections 622, 623 (see FIG. 2). Also, comparators 624A, 625A output results of comparison between the aforesaid signal waves and the carrier C0, similarly to the comparators 624, 625 (see FIG. 2). With respect to the U-phase, the outputs of the comparators 624A, 625A correspond to the above-mentioned logical values J1, J3, respectively.

In the second inverter control section 62, computation sections 622B, 623B and comparators 624B, 625B are further provided. The computation sections 622B, 623B generate signal waves dst(1−V*), drt·V*, respectively. The comparators 624B, 625B also output results of comparison between the aforesaid signal waves and the carrier C0, similarly to the comparators 624, 625 (see FIG. 2). With respect to the U-phase, the outputs of the comparators 624B, 625B correspond to the above-mentioned logical values J2, J4, respectively.

Unlike the configuration shown in FIG. 2, the second inverter control section 62 shown in FIG. 8 has a logic synthesis section 628 instead of the logical sum computation section 629. For the logical computation of the logical values J1 to J4 described above, merely the logical sum is not sufficient, but the process of the inversion and the logical product are also required.

In this manner, in order that the vector pattern can repeatedly appear N-times in the time periods dst·T, drt·T, the number of non-commutation zero vector time periods required is (N−1). Accordingly, in a case where an N-times multiplication is virtually performed using the carrier C0 without any change made thereon, the number of signal waves required for each phase in each of the time periods dst·T, drt·T is increased by (N−1) as compared with a case where the carrier C0 is actually multiplied. Since the number of signal waves required for each phase is one in a case where the carrier C0 is actually multiplied (corresponding to a case where N=1 is adopted for the number N), N signal waves are required in a case where the carrier C0 is virtually multiplied.

Here, a case of d02+d04+d0=1 is shown as an example. With respect to the W-phase, the signal wave for the carrier C0 has substantially two types of the values 0, 1. Therefore, with respect to the W-phase, when the carrier C0 is substantially multiplied N-times, the number is apparently not different from when the multiplication is actually performed, even if the multiplication is virtually performed.

However, in a case of d02+d04+d0<1, two carriers are set in each of the time periods dst·T, drt·T, with respect to the W-phase, too. Therefore, it can be recognized that the values 0, 1 are actually special values of the signal wave which is set based on the arrangement pattern of adopted vectors, and are used in both of the time periods dst·T, drt·T.

It is actually not possible that the inverter 5 is driven with the W-phase constantly serving as the minimum phase, but the U-phase, the V-phase, and the W-phase alternately serve as the minimum phase. Thus, it can also be recognized that, eventually, in any of the phases, N signal waves set based on the vector arrangement pattern is required for each phase in each of the time periods dst·T, drt·T.

(c-2) Case where the carrier is a triangular wave and N=3.

Figure 9:
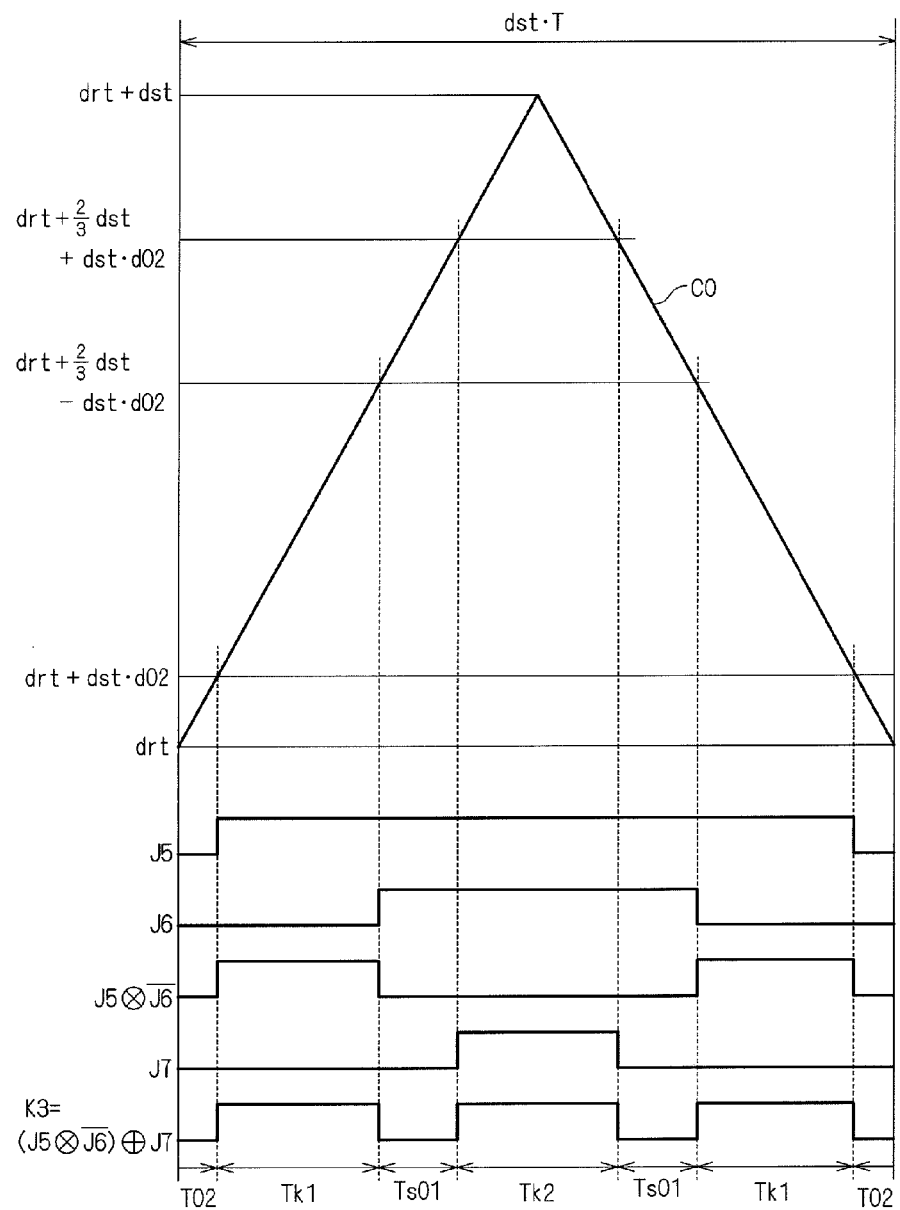
FIG. 9 is a graph showing a carrier and logical values constituting a part of a gate signal.
Figure 10:
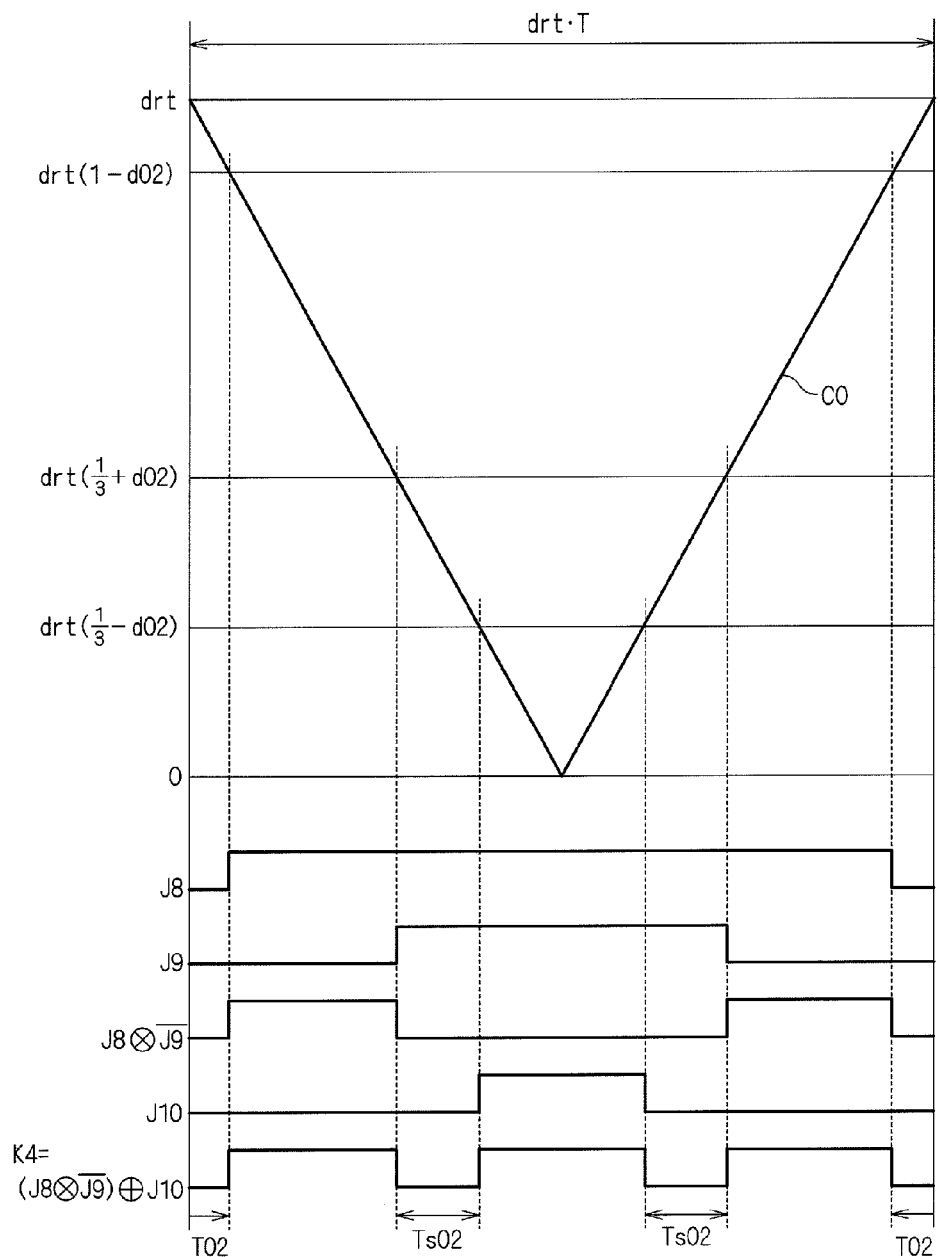
FIG. 10 is a graph showing a carrier and logical values constituting a part of a gate signal.

Next, a case of N=3 will be described. FIGS. 9 and 10 are graphs showing the carrier C0 and logical values constituting a part of the second inverter gate signal Sup2*. In the following, in order to avoid complication, consideration of the second inverter gate signals Svp2*, Swp2* is omitted, too. FIGS. 9 and 10 show waveforms in the time periods dst·T, drt·T, respectively.

The number of signal waves which are set based on the arrangement pattern of adopted vectors is 2 N (=6) for each phase. More specifically, N (=3) signal waves drt+dst·d02, drt+(⅔)dst−dst·d02, drt30 (⅔)dst+dst·d02 which can be taken by the carrier C0 in the time period dst·T (see FIG. 9), and N signal waves drt(1−d02), drt(⅓+d02), drt(⅓−d02) which can be taken by the carrier C0 in the time period drt·T (see FIG. 10), are set.

Referring to FIG. 9, only when the carrier C0 takes the signal wave drt+dst·d02 or higher, a logical value J5 is "H". Only when the carrier C0 takes the signal wave drt+(⅔)dst−dst·d02 or higher, a logical value J6 is "H". Only when the carrier C0 takes the signal wave drt+(⅔)dst+dst·d02 or higher, a logical value J7 is "H".

Referring to FIG. 10, only when the carrier C0 takes the signal wave drt(1−d02) or lower, a logical value J8 is "H". Only when the carrier C0 takes the signal wave drt(⅓+d02) or lower, a logical value J9 is "H". Only when the carrier C0 takes the signal wave drt(⅓−d02) or lower, a logical value J10 is "H".

As clearly seen in comparison with the graphs shown in FIG. 3, the logical sum of the logical values J5, J8 corresponds to the first inverter gate signal Sup1*. In other words, a time period in which the logical sum of the logical values J5, J8 is "L" corresponds to the commutation zero vector time period T01.

Thus, the second inverter gate signal Sup2* in the time period dst·T is obtained as the logical sum of logical values K3, K4. Here, the logical value K3 is the logical sum of the logical value J7 and the logical product of the logical value J5 and the inverse of the logical value J6. The logical value K4 is the logical sum of the logical value J10 and the logical product of the logical value J8 and the inverse of the logical value J9. The other second inverter gate signals Svp2*, Swp2* are obtained in the same manner.

The carrier C0 is a triangular wave which takes the minimum value drt and the maximum value drt+dst=1 in the time period dst·T. Accordingly, a time period in which the carrier C0 takes a value between the signal waves drt+(⅔)dst−dst·d02 and drt+(⅔)dst+dst·d02 is the non-commutation zero vector time period Ts01. A time period in which the carrier C0 takes a value between the minimum value drt (in the time period dst·T) and the signal wave drt+dst·d02 is the commutation zero vector time period T02 (in the time period dst·T). The width of the signal wave corresponding to the non-commutation zero vector time period Ts01 is 2·dst·d02. The width of the signal wave corresponding to the commutation zero vector time period T02 which appears in the time period dst·T is dst·d02. Additionally, in the time period dst·T, the commutation zero vector time period T02 appears twice. Therefore, the length of the commutation zero vector time period T02 appearing in the time period dst·T and the length of each of the non-commutation zero vector time periods Ts01 are equal to each other.

A time period Tk1 interposed between the commutation zero vector time period T02 and the non-commutation zero vector time period Ts01 is a time period in which the carrier C0 takes a value between the signal waves drt+(⅔)dst−dst·d02 and drt+dst·d02. A difference between these signal waves is (⅔)dst−dst·d02. A time period Tk2 interposed between a pair of non-commutation zero vector time period Ts01 is a time period in which the carrier C0 makes a round trip between the signal wave drt+(⅔)dst+dst·d02 and the maximum value drt+dst=1. A difference between the signal wave and the maximum value is (⅓)dst−dst·d02. Therefore, the lengths of the time periods Tk1, Tk2 are equal to each other.

As described above, the time periods in which the zero vector V02 is adopted in the time period dst·T are equal to each other, and the time periods in which the other vectors (specifically, the vectors V42, V62) are adopted are equal to each other. Thus, an arrangement pattern with good symmetry can be obtained. The same is true in the time period drt·T.

Figure 11:
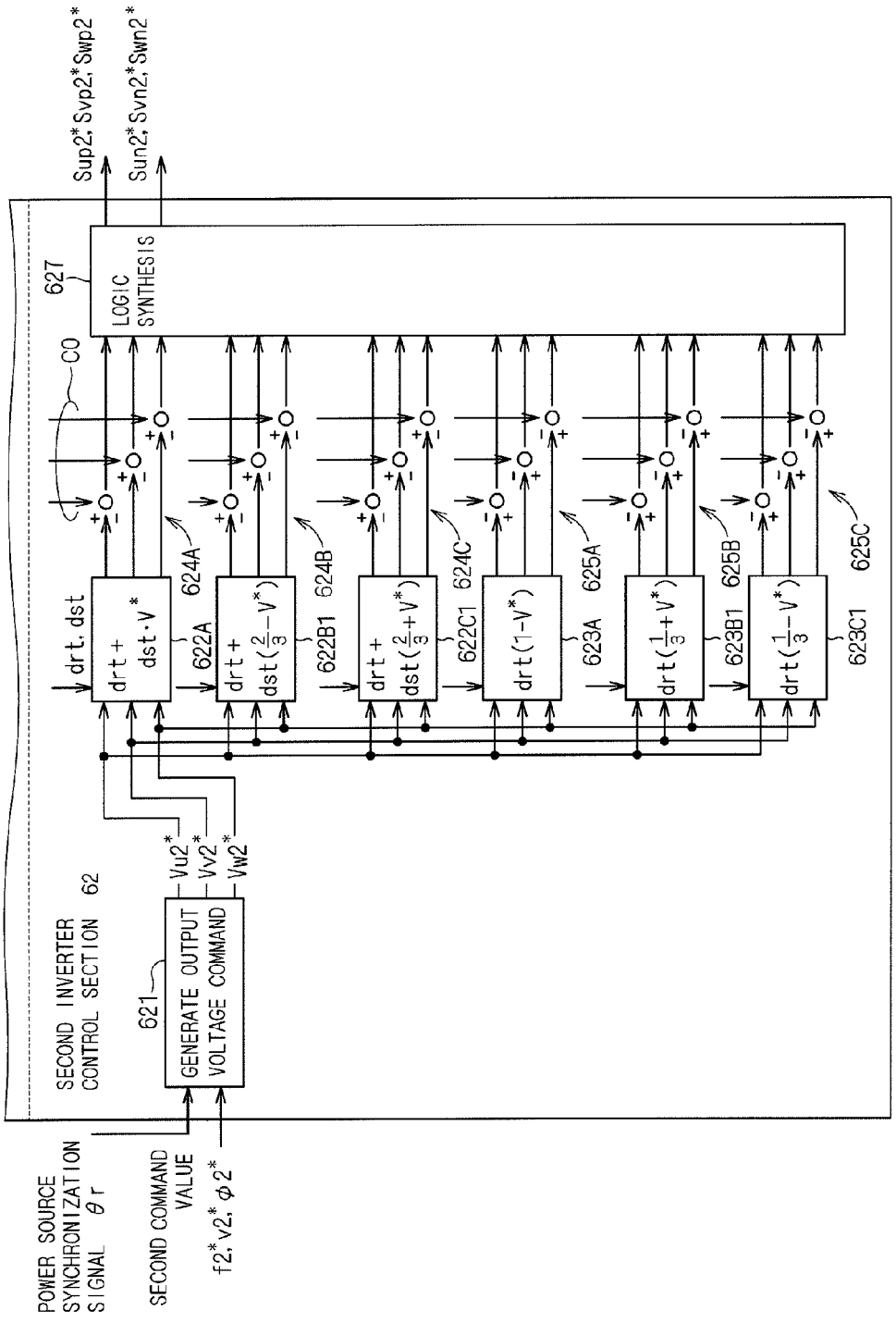
FIG. 11 is a block diagram showing a configuration of the second inverter control section.

FIG. 11 is a block diagram showing a configuration of the second inverter control section 62 in a case where the number of signal waves used per one phase is 3 N in this manner. In this configuration, computation sections 622C1, 623C1 and comparators 624C, 625C are added to the configuration shown in FIG. 8, a logic synthesis section 627 is provided in place of the logic synthesis section 628, and computation sections 622B1, 623B1 are provided in place of the computation sections 622B, 623B, respectively.

As described in (c-1), the computation sections 622A, 623A generate the signal waves drt+dst·V*, drt(1−V*), respectively. The comparators 624A, 625A output results of comparison between the aforesaid signal waves and the carrier C0. With respect to the U-phase, the outputs of the comparators 624A, 625A correspond to the above-mentioned logical values J5, J8, respectively.

The computation sections 622B1, 623B1 generate signal waves drt+dst(⅔−V*), drt(⅓+V*), respectively. The comparators 624B, 625B output results of comparison between the aforesaid signal waves and the carrier C0. With respect to the U-phase, the outputs of the comparators 624B, 625B correspond to the above-mentioned logical values J6, J9, respectively.

The computation sections 622C1, 623C1 generate signal waves drt+dst(⅔+V*), drt(⅓−V*), respectively. The comparators 624C, 625C output results of comparison between the aforesaid signal waves and the carrier C0. With respect to the U-phase, the outputs of the comparators 624C, 625C correspond to the above-mentioned logical values J7, J10, respectively.

With respect to the U-phase, the logic synthesis section 627 obtains the logical values K3, K4 based on the logical values J5 to J10, takes the logical sum of the logical values K3, K4, and outputs the second inverter gate signal Sup2*. The other second inverter gate signals Svp2*, Swp2* are outputted in the same manner.

Here, a case of d02+d04+d0=1 is shown as an example. With respect to the W-phase, the signal wave for the carrier C0 has substantially two types of the values 0, 1. However, as described in (c-1), too, it is eventually recognized that 3 N signal waves set based on the vector arrangement pattern are required for each phase in each of the time periods dst·T, drt·T.

(c-3) Case where the carrier is a saw-teeth wave and N=2

Figure 12:
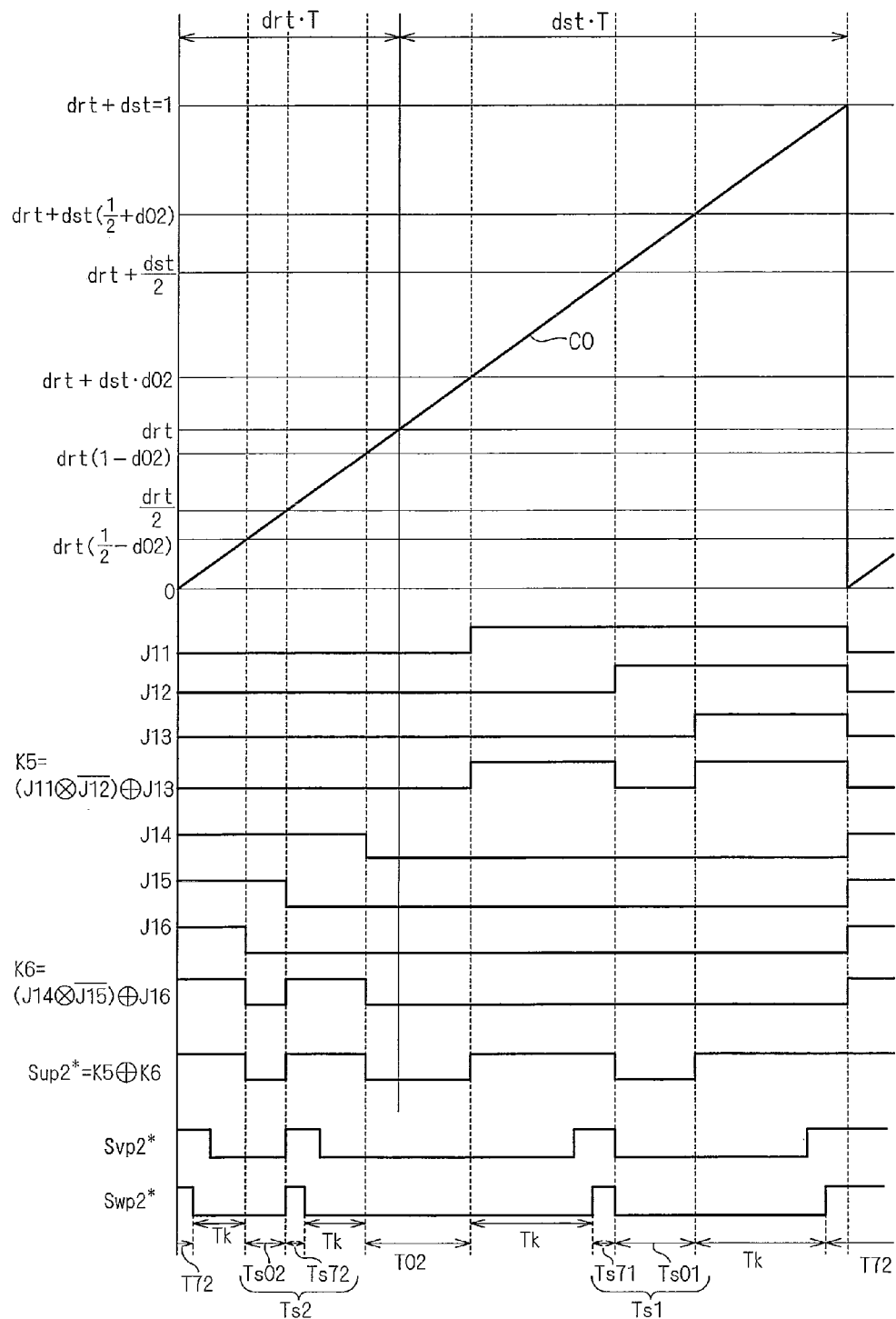
FIG. 12 is a graph showing waveforms of a carrier and gate signals.

FIG. 12 is a graph showing the carrier C0 having a saw-teeth wave, and the second inverter gate signals Sup2*, Svp2*, Swp2*. When a saw-teeth wave is adopted as the carrier C0, it is also necessary to obtain (N−1) non-commutation zero vector time periods for each phase in each of the time periods dst·T, drt·T, and thus 2 N signal waves, which are set based on the arrangement pattern of adopted vectors, are required for each phase. When a saw-teeth wave is adopted as the carrier, (N−1) signal waves are further required in each of the time periods dst·T, drt·T. The reason therefor is as follows.

As understood from FIG. 6, when a carrier having a saw-teeth wave repeatedly exhibits the same waveform N-times in the time periods dst·T and drt·T, the carrier steeply changes between the minimum value and the maximum value in each time period (N−1)-times. Therefore, in order to use the carrier C0, instead of adopting this repeated waveform, to repeat an arrangement pattern of vectors except the zero vector N-times, (N−1) signal waves are adopted in each of the time periods dst·T and drt·T.

Thus, in order to virtually multiply a carrier frequency by devising a signal wave for the carrier C0 having a saw-teeth wave, it is necessary to add 2(N−1) signal waves as compared with when the carrier C0 having a triangular wave is adopted.

Timings of the steep change in the saw-teeth wave shown in FIG. 6 are fixed to time points which divide the time periods dst·T and drt·T into N equal parts, and are not based on a pattern of adopted vectors but based on the values drt, dst which are the current conduction ratio. To be specific, the added signal wave takes values drt(K/N), drt+dst(K/N), where K is an integer equal to or greater than 1 and less than N. Here, a case of N=2 is shown as an example, and therefore signal waves drt/2, drt+dst/2 are taken corresponding to the time periods drt·T and dst·T, respectively.

There are set three signal waves drt(½−d02), drt/2, drt(1−d02) which can be taken by the carrier C0 in the time period drt·T, and three signal waves drt+dst·d02, drt+dst/2, drt+dst(½+d02) which can be taken by the carrier C0 in the time period dst·T.

Only when the carrier C0 takes the signal wave drt+dst·d02 or higher, a logical value J11 is "H". Only when the carrier C0 takes the signal wave drt+dst/2 or higher, a logical value J12 is "H". Only when the carrier C0 takes the signal wave drt+dst(½+d02) or higher, a logical value J13 is "H". Only when the carrier C0 takes the signal wave drt(1−d02) or lower, a logical value J14 is "H". Only when the carrier C0 takes the signal wave drt/2 or lower, a logical value J15 is "H". Only when the carrier C0 takes the signal wave drt(½−d02) or lower, a logical value J16 is "H".

The second inverter gate signal Sup2* in the time period dst·T is obtained as a logical value K5 which is the logical sum of the logical value J13 and the logical product of the logical value J11 and the inverse of the logical value J12. The second inverter gate signal Sup2* in the time period drt·T is obtained as a logical value K6 which is the logical sum of the logical value J16 and the logical product of the logical value J14 and the inverse of the logical value J15. Accordingly, the second inverter gate signal Sup2* is obtained as the logical sum of the logical value K5 and the logical value K6. The other second inverter gate signals Svp2*, Swp2* are obtained in the same manner.

In a case where the carrier is a saw-teeth wave, as introduced in the Japanese Patent Application Laid-Open No. 2007-312589 (for example, its paragraph 0073 and FIG. 9), when the carrier steeply changes between the minimum value (for example, 0) and the maximum value (for example, 1), a commutation is caused in the converter at a zero current also using the zero vector V72. That is, the zero vector V72 is adopted in a commutation zero vector time period T72 including a timing of the commutation in the converter. In order to adopt the zero vector V72, d01+d41+d61<1 is set in the inverter 5.

This embodiment assumes that the inverter 5 adopts not only zero vectors but also V42, V62. Therefore, among the second inverter gate signals, the second inverter gate signal Swp2* has the shortest activation time period. Moreover, activation of the second inverter gate signal Swp2* inevitably involves activation of the second inverter gate signals Sup2*, Svp2*. Thus, the commutation zero vector time period T72 is coincident with the time period in which the second inverter gate signal Swp2* is activated.

In the commutation zero vector time period T02 including the timing when the commutation is caused when the carrier C0 inclined with respect to time takes the value drt, the zero vector V02 is adopted similarly to when a triangular wave is used as the carrier C0.

On the other hand, the signal waves drt/2, drt+dst/2 are used in the non-commutation zero vector time periods Ts1, Ts2, and thereby the zero vectors V02 and V72 are adopted in this order or the reverse order. Hereinafter, this point will be described.

The saw-teeth wave adopted herein includes a portion which is inclined with time to rise from the value 0 to the value 1, and a portion which steeply drops from the value 1 to the value 0. Since the signal waves drt/2, drt+dst/2 are used, it can be recognized that when the carrier C0 takes these values, the saw-teeth wave virtually steeply drops. Therefore, similarly to the boundary between the expiration of the time period dst·T and the beginning of the time period drt·T (in the drawing, the timing indicated by the rightmost broken line), a time period Ts72 in which the vector V72 is adopted occurs immediately after the timing when the carrier C0 takes the signal wave drt/2. Immediately before this timing, the time period Ts02 in which the vector V02 is adopted corresponding to the signal wave dst(½−d02) occurs. The time periods Ts02, Ts72 are continuous with each other at the timing when the carrier C0 takes the signal wave drt/2, and include both of the zero vectors V02, V72 which are adopted in the commutation zero vector time periods T02, T72, respectively. Therefore, they can be collectively recognized as the non-commutation zero vector time period Ts2.

In the same manner, a time period Ts71 in which the vector V72 is adopted occurs immediately before the timing when the carrier C0 takes the signal wave drt+dst/2. Immediately after this timing, the time period Ts01 in which the vector V02 is adopted corresponding to the signal wave drt+dst(½+d02) occurs. The time periods Ts01, Ts71 are continuous with each other at the timing when the carrier C0 takes the signal wave drt+dst/2, and include both of the zero vectors V02, V72. Therefore, they can be collectively recognized as the non-commutation zero vector time period Ts1.

The carrier C0 is a saw-teeth wave which takes the minimum value 0 and the maximum value drt in the time period drt·T. In the time period drt·T, the second inverter gate signal Sup2* becomes "H" twice, and each of the time periods thereof corresponds to the value drt(½−d02). Accordingly, the lengths of time periods in which the second inverter gate signal Sup2* is activated in the time period drt·T are equal to each other.

In view of the fact that the second inverter gate signal Swp2* can be also obtained in the same manner as the second inverter gate signal Sup2*, the length of two time periods in which the second inverter gate signal Swp2* is activated in the time period drt·T, that is, the length of a part of the commutation zero vector time period T72 and the length of the time period Ts72 are equal to each other.

Therefore, in the time period drt·T, the time period Tk interposed between the time period T72 and the time period Ts02 and the time period Tk interposed between the time period Ts72 and the time period T02 have their lengths equal to each other. In this manner, the length of the time period Tk interposed between the commutation zero vector time period T72 and the non-commutation zero vector time period Ts2 and the length of the time period Tk interposed between the commutation zero vector time period T02 and the non-commutation zero vector time period Ts2 are equal to each other, and moreover vectors except the zero vectors V02, V72 adopted in the commutation zero vector time period T02, T72 are adopted in the time period Tk.

From the above, an arrangement pattern with good symmetry can be obtained in the time period drt·T. An arrangement pattern with good symmetry can also be obtained in the time period dst·T.

Figure 13:
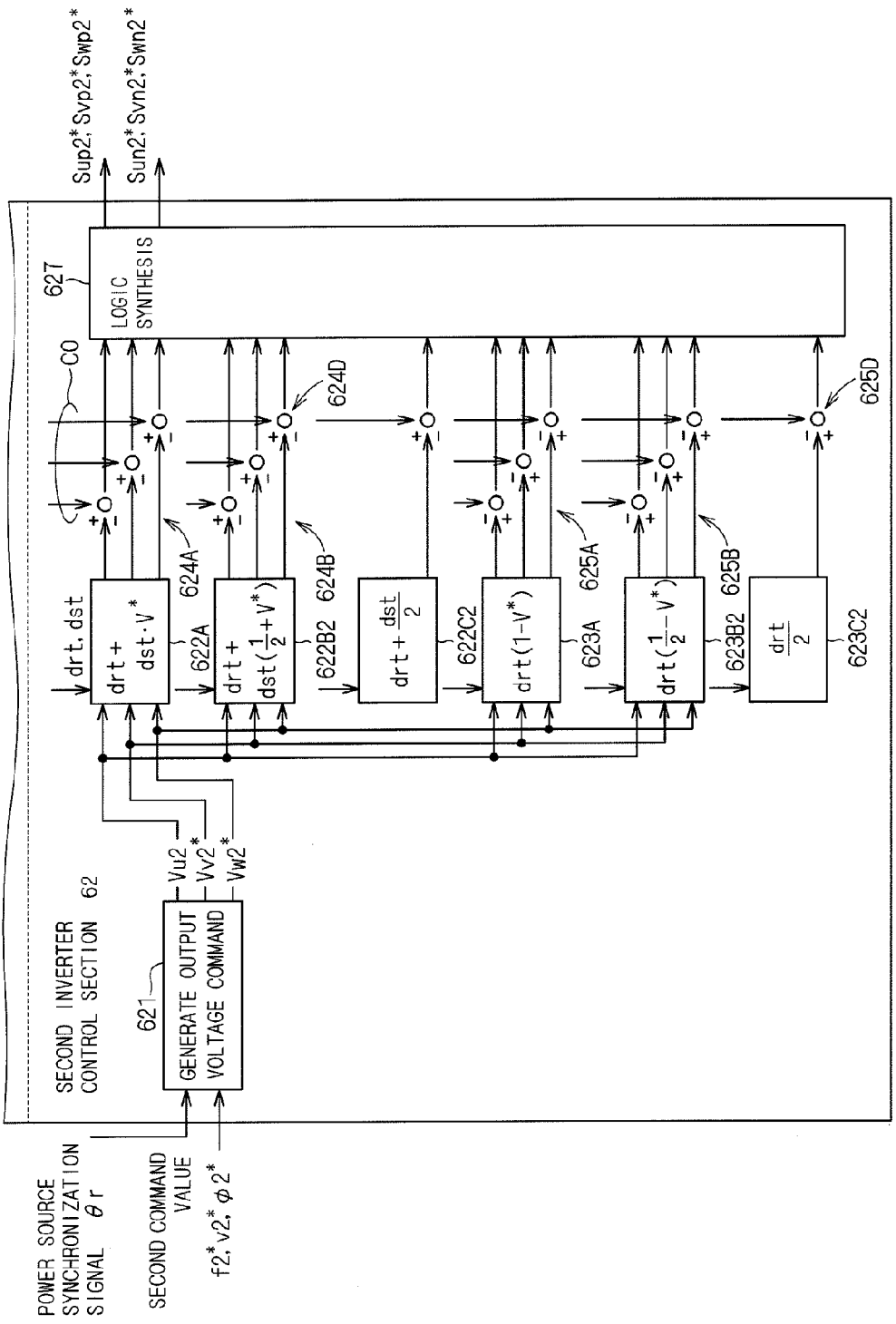
FIG. 13 is a block diagram showing a configuration of the second inverter control section.

FIG. 13 is a block diagram showing a configuration of the second inverter control section 62 in a case where the number of signal waves used per one phase is 3N in this manner. In this configuration, computation sections 622B2, 623B2, 622C2, 623C2, and comparators 624D, 625D are provided in place of the computation sections 622B1, 623B1, 622C1, 623C1, and the comparators 624C, 625C of the configuration shown in FIG. 11, respectively.

As described in (c-1), the computation sections 622A, 623A generate the signal waves drt+dst·V*, drt(1−V*), respectively. The comparators 624A, 625A output results of comparison between the aforesaid signal waves and the carrier C0. With respect to the U-phase, the outputs of the comparators 624A, 625A correspond to the above-mentioned logical values J11, J14, respectively.

The computation sections 622B2, 623B2 generate signal waves drt+dst(½+V*), drt(½−V*), respectively. The comparators 624B, 625B output results of comparison between the aforesaid signal waves and the carrier C0. With respect to the U-phase, the outputs of the comparators 624B, 625B correspond to the above-mentioned logical values J13, J16, respectively.

The computation sections 622C2, 623C2 generate the signal waves drt+dst/2, drt/2, respectively. The comparators 624D, 625D output results of comparison between the aforesaid signal waves and the carrier C0. With respect to any of the U-phase, the V-phase, and the W-phase, the outputs of the comparators 624D, 625D correspond to the above-mentioned logical values J12, J15, respectively. Thus, unlike the other comparators 624A, 624B, 625A, 625B, it is not necessary that a comparison element is provided for each phase.

With respect to the U-phase, the logic synthesis section 627 obtains the logical values K5, K6 based on the logical values J11 to J13, takes the logical sum of the logical values K5, K6, and outputs the second inverter gate signal Sup2*. The other second inverter gate signals Svp2*, Swp2* are outputted in the same manner. Since logical computation based on these logical values J11 to J13 is the same as logical computation based on the logical values J5 to J10 described in (c-2), a configuration of the logic synthesis section 627 is in common with that shown in FIG. 11.

D. Virtual Fraction Multiplication of Carrier Frequency by Increase of Signal Wave The devising of the signal wave as described in the foregoing section C may be applied to only any one of the time periods drt·T, dst·T.

Figure 14:
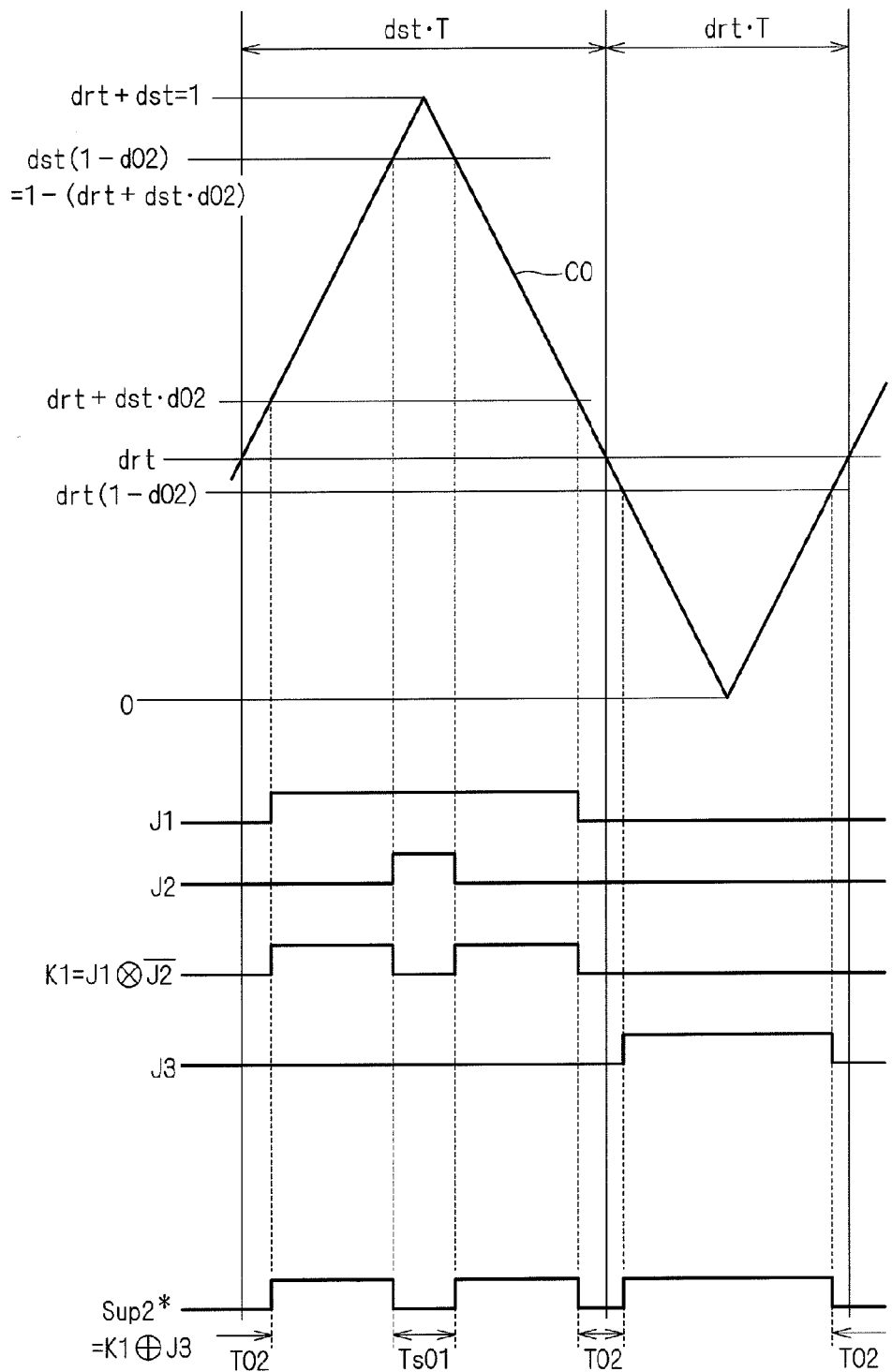
FIG. 14 is a graph showing waveforms of a carrier and a gate signal.

FIG. 14 is a graph showing the carrier C0 and the second inverter gate signal Sup2*, and shows a case where the two signal waves drt+dst·d02, dst(1−d02) described in (c-1) are taken in the time period dst·T, and the one signal wave drt(1−d02) is taken in the time period drt·T. In this case, in a virtual sense, a pulse-width modulation can be performed with a 3/2-times multiplication of the frequency of the converter carrier C0.

Figure 15:
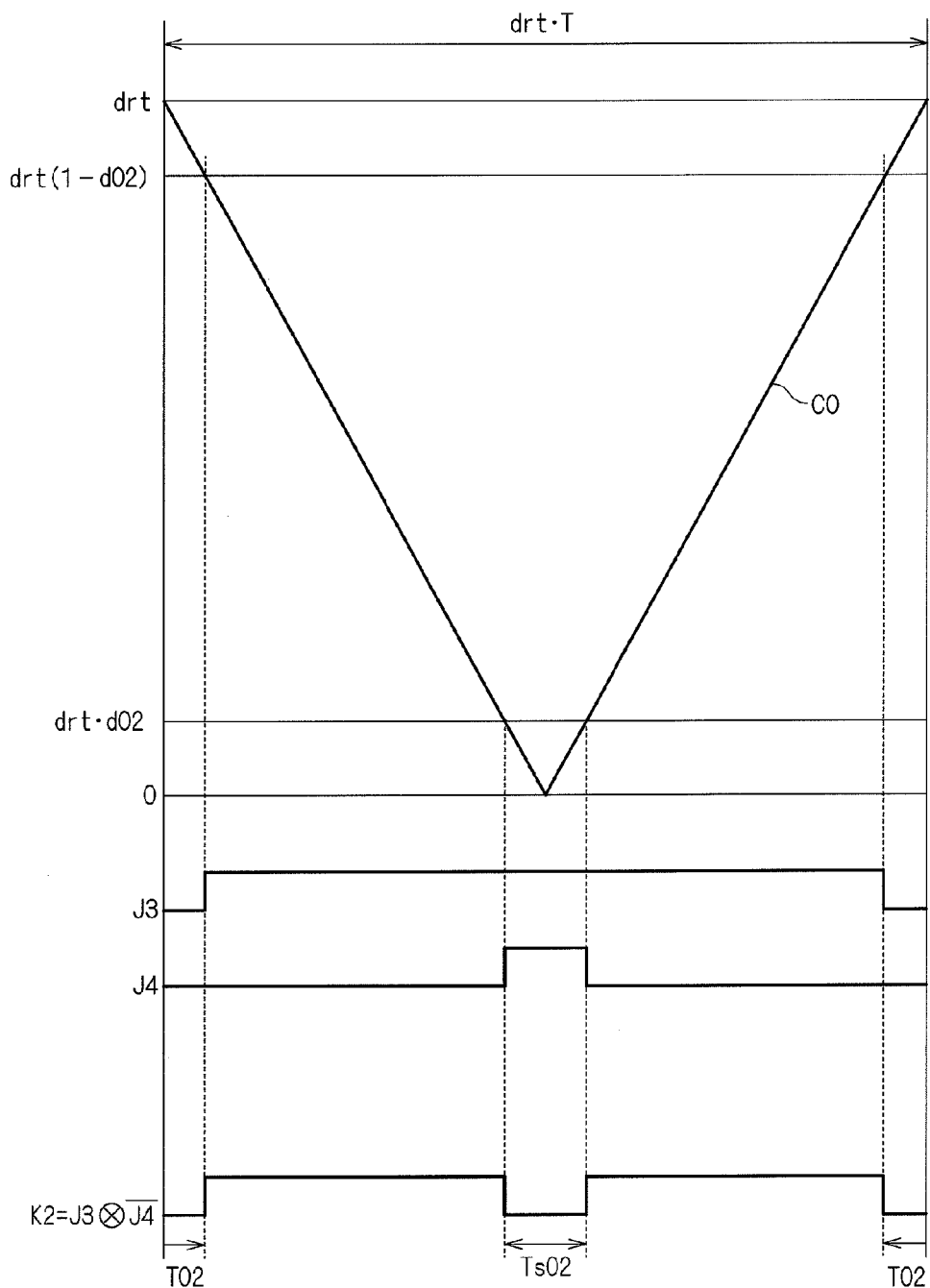
FIG. 15 is a graph showing a carrier and a logical value constituting a part of a gate signal.

FIG. 15 is a graph showing the carrier C0 and the logical value K2 constituting a part of the second inverter gate signal Sup2*. The two signal waves drt(1−d02), drt−d02 described in (c-1) are taken in the time period drt·T. In the time period dst·T, the signal waves drt+dst·d02, drt+(⅔)dst−dst·d02, drt+(⅔)dst+dst·d02 shown in FIG. 9 may also be taken. In this case, in a virtual sense, a pulse-width modulation can be performed with a 5/2-times multiplication of the frequency of the converter carrier C0.

Such a virtual fraction multiplication is easy to control, as compared with a case where an actual multiplication is performed. A carrier actually multiplied by a fraction does not take the value drt at the timing of the commutation of the converter carrier C0 (the timing when the value drt is taken), and therefore it is difficult to cause the commutation in the converter 3 at a zero current.

While the invention has been described in detail, the foregoing description is in all aspects illustrative and not restrictive. It is therefore understood that numerous modifications and variations can be devised without departing from the scope of the invention.

DESCRIPTION OF THE REFERENCE NUMERALS 3 converter
4, 5 inverter
6 gate signal generation device
60 converter control section
61 first inverter control section
62 second inverter control section
601 trapezoidal voltage command generation section
602 intermediate phase detection section
603, 614, 615, 624, 625, 624A, 625A, 624B, 625B, 624C, 625C comparator
604, 605 carrier generation section
612, 613, 622, 623, 622A, 622B, 622B1, 622B2, 622C1, 622C2, 623A, 623B, 623B1, 623B2, 623C1, 623C2 computation section
609 current-source gate logic transformation section
619, 629 logical sum computation section
627, 628 logic synthesis section
C0 converter carrier
C1 first carrier
C2 second carrier
drt, dst current conduction ratio
dst(1−V*), drt+dst·V*, drt·V*, drt+(⅔)dst+dst·V*, drt+(⅔)dst−dst·V*, drt(1−V*), drt(⅓+V*), drt(⅓−V*), drt+dst/2, drt/2 signal wave
L1, L2 DC power supply line
Srp*, Ssp*, Stp*, Srn*, Ssn*, Stn* converter gate signal
Sup1, Sun1, Svp1, Svn1, Swp1, Swn1, Sup2, Sun2, Svp2, Svn2, Swp2, Swn2 switching element
Sup1* Sun1*, Svp1*, Svn1*, Swp1*, Swn1*, Sup2*, Sun2*, Svp2*, Svn2*, Swp2*, Swn2* inverter gate signal
T one cycle
T01, T02 commutation zero vector time period
Ts01, Ts02, Ts1, Ts2 non-commutation zero vector time period
V01, V41, V61, V02, V42, V62, V72 instantaneous space vector
V01, V02, V72 zero vector
Vu1*, Vv1*, Vw1*, Vu2*, Vv2*, Vw2* phase voltage command
Vr, Vs, Vt AC voltage

The invention claimed is:

1. A method for controlling a direct converting apparatus, said direct converting apparatus comprising:
   a converter rectifying multi-phase AC voltages by a pulse-width modulation and outputting them to a pair of DC power supply lines; and
   a first inverter and a second inverter being connected in parallel with each other between said pair of DC power supply lines, each of them being operated in a pulse-width modulation according to an instantaneous space vector control,
   said method comprising:
   causing a commutation in said converter when a converter carrier takes the value of a converter command value, one cycle of said converter carrier being divided by a first value and a second value into a first time period and a second time period at a timing when said commutation is caused;
   adopting a zero vector in a first commutation zero vector time period which is a time period including said timing, as instantaneous space vectors adopted for said instantaneous space vector control of said first inverter;
   adopting a zero vector in a second commutation zero vector time period which is a time period including said timing, as instantaneous space vectors used for said instantaneous space vector control of said second inverter;
   in said first time period, adopting, M-times (M is an integer equal to or greater than 1), an arrangement pattern of said instantaneous space vectors in said first inverter except said zero vector adopted in said first commutation zero vector time period; and
   in said first time period, adopting, N-times (N is an integer equal to or greater than 2, and different from said M), an arrangement pattern of said instantaneous space vectors in said second inverter except said zero vector adopted in said second commutation zero vector time period.

2. The method for controlling the direct converting apparatus according to claim 1, wherein
   in said second inverter, said first time period has (N−1) non-commutation zero vector time periods which are separated from said second commutation zero vector time period and in which said zero vector adopted in said second commutation zero vector time period is adopted,
   orders of vectors used for said instantaneous space vector control of said second inverter in time periods, each of which is interposed between said second commutation zero vector time period and said non-commutation zero vector time period, are equal to each other.

3. The method for controlling the direct converting apparatus according to claim 2, wherein
   a first carrier adopted for said instantaneous space vector control of said first inverter and a second carrier adopted for said instantaneous space vector control of said second inverter are synchronized with said converter carrier,
   in said first carrier, the same waveform appears said M-times in said first time period,
   in said second carrier, the same waveform appears said N-times in said first time period.

4. The method for controlling the direct converting apparatus according to claim 2, wherein
   a first carrier adopted for said instantaneous space vector control of said first inverter is synchronized with said converter carrier,
   a second carrier adopted for said instantaneous space vector control of said second inverter has a cycle equal to a cycle of said converter carrier,
   in said first time period, for said second carrier, N signal waves are set with respect to each phase of said second inverter, said N signal waves being set based on said arrangement pattern in said second inverter.

5. The method for controlling the direct converting apparatus according to claim 4, wherein
   for said second carrier, in said second inverter, (N−1) signal waves are further set in said first time period, said (N−1) signal waves being not based on said arrangement pattern but based on said first value and said second value.

6. A direct converting apparatus being controlled by the method according to claim 1, said direct converting apparatus comprising said converter, said first inverter, and said second inverter.

7. A direct converting apparatus being controlled by the method according to claim 2, said direct converting apparatus comprising said converter, said first inverter, and said second inverter.

8. A direct converting apparatus being controlled by the method according to claim 3, said direct converting apparatus comprising said converter, said first inverter, and said second inverter.

9. A direct converting apparatus being controlled by the method according to claim 4, said direct converting apparatus comprising said converter, said first inverter, and said second inverter.

10. A direct converting apparatus being controlled by the method according to claim 5, said direct converting apparatus comprising said converter, said first inverter, and said second inverter.

11. A control signal generation device controlling a direct converting apparatus,
    said direct converting apparatus comprising:
        a converter rectifying multi-phase AC voltages and outputting them to a pair of DC power supply lines; and
        a first inverter and a second inverter being connected in parallel with each other between said pair of DC power supply lines,
    said control signal generation device comprising:
        a first inverter control section outputting a first control signal for operating said first inverter in a pulse-width modulation according to an instantaneous space vector control;
        a second inverter control section outputting a second control signal for operating said second inverter in a pulse-width modulation according to an instantaneous space vector control; and
        a converter control section outputting a third control signal for causing a commutation in said converter,
    said converter control section including:
        a carrier generation section generating a converter carrier;
        a converter command generation section generating a converter command value;
        a third control signal generation section generating said third control signal for performing a pulse-width control of said converter, by using a result of comparison between said converter carrier and said converter command value; and
        an intermediate phase detection section outputting a current conduction ratio of an intermediate phase of the command value for said converter,
    said first inverter control section including:
        a first output command generation section generating a first output command value which is a command value of an output of said first inverter;
        a first computation section generating a first inverter signal wave to be compared with a first carrier synchronized with said converter carrier, based on said current conduction ratio and said first output command value; and
        a first control signal generation section generating said first control signal based on a result of said comparison,
    said second inverter control section including:
        a second output command generation section generating a second output command value which is a command value of an output of said second inverter;
        a second computation section generating a second inverter signal wave to be compared with a second carrier synchronized with said converter carrier, based on said current conduction ratio and said second output command value; and
        a second control signal generation section generating said second control signal based on a result of said comparison,
    wherein
    as instantaneous space vectors adopted for said instantaneous space vector control of said first inverter, a zero vector is adopted in a first commutation zero vector time period which is a time period including a timing when said converter carrier takes the value of said intermediate phase,
    as instantaneous space vectors used for said instantaneous space vector control of said second inverter, a zero vector is adopted in a second commutation zero vector time period which is a time period including said timing,
    in one cycle of said converter carrier, in a first time period divided by said timing, an arrangement pattern of said instantaneous space vectors adopted by said first inverter except said zero vector adopted in said first commutation zero vector time period appears M-times (M is an integer equal to or greater than 1),
    in said first time period, an arrangement pattern of said instantaneous space vectors adopted by said second inverter except said zero vector adopted in said second commutation zero vector time period appears N-times (N is an integer equal to or greater than 2, and different from said M).

12. The control signal generation device according to claim 11, wherein
    in said second inverter, said first time period has (N−1) non-commutation zero vector time periods which are separated from said second commutation zero vector time period and in which said zero vector adopted in said second commutation zero vector time period is adopted,
    orders of vectors used for said instantaneous space vector control of said second inverter in time periods, each of which is interposed between said second commutation zero vector time period and said non-commutation zero vector time period, are equal to each other.

13. The control signal generation device according to claim 12, wherein
    in said first carrier, the same waveform appears said M-times in said first time period,
    in said second carrier, the same waveform appears said N-times in said first time period.

14. The control signal generation device according to claim 12, wherein
    a second carrier adopted for said instantaneous space vector control of said second inverter has a cycle equal to a cycle of said converter carrier,
    in said first time period (dst·T), for said second inverter signal wave, N values are set with respect to each phase, said N values being based on said arrangement pattern.

15. The control signal generation device according to claim 14, wherein
    for said second inverter signal wave, (N−1) values are further set, said (N−1) values being not based on said arrangement pattern but based on said current conduction ratio.

16. A direct converting apparatus having the control signal generation device according to claim 11, said direct converting apparatus comprising:

said converter, said first inverter, and said second inverter.

17. A direct converting apparatus having the control signal generation device according to claim 12, said direct converting apparatus comprising:

said converter, said first inverter, and said second inverter.

18. A direct converting apparatus having the control signal generation device according to claim 13, said direct converting apparatus comprising:

said converter, said first inverter, and said second inverter.

19. A direct converting apparatus having the control signal generation device according to claim 14, said direct converting apparatus comprising:

said converter, said first inverter, and said second inverter.

20. A direct converting apparatus having the control signal generation device according to claim 15, said direct converting apparatus comprising:

said converter, said first inverter, and said second inverter.

* * * * *